(12) United States Patent
Fukuda et al.

(10) Patent No.: US 8,098,302 B2
(45) Date of Patent: Jan. 17, 2012

(54) STAIN DETECTION SYSTEM

(75) Inventors: Mitsuaki Fukuda, Kawasaki (JP); Soichi Hama, Kawasaki (JP); Takahiro Aoki, Kawasaki (JP); Toshio Endoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 12/329,860

(22) Filed: Dec. 8, 2008

(65) Prior Publication Data

US 2009/0087022 A1 Apr. 2, 2009

Related U.S. Application Data

(63) Continuation of application No. PCT/JP2006/311527, filed on Jun. 8, 2006.

(51) Int. Cl.
*H04N 5/217* (2006.01)

(52) U.S. Cl. ............... 348/241; 348/14.12; 348/231.99; 382/100

(58) Field of Classification Search ............ 348/231.99, 348/241, 14.12; 382/100
See application file for complete search history.

(56) References Cited

U.S. PATENT DOCUMENTS

| | | | | |
|---|---|---|---|---|
| 7,778,542 | B2* | 8/2010 | Oshima | 396/236 |
| 2004/0041936 | A1* | 3/2004 | Uchiyama | 348/335 |
| 2005/0078173 | A1* | 4/2005 | Steinberg et al. | 348/14.12 |
| 2007/0159551 | A1* | 7/2007 | Kotani | 348/349 |
| 2010/0226532 | A1* | 9/2010 | Hayasaka et al. | 382/103 |

FOREIGN PATENT DOCUMENTS

| | | |
|---|---|---|
| JP | 60-124783 A | 7/1985 |
| JP | 8-202998 A | 8/1996 |
| JP | 11-195121 A | 7/1999 |
| JP | 2001-8193 A | 1/2001 |
| JP | 2002-94978 A | 3/2002 |
| JP | 2002-290994 A | 10/2002 |
| JP | 2003-259358 A | 9/2003 |
| JP | 2004-172820 A | 6/2004 |
| JP | 2005-72629 A | 3/2005 |
| JP | 2005-117262 A | 4/2005 |

OTHER PUBLICATIONS

International Search Report of PCT/JP2006/311527, Mailing Date of Jul. 4, 2006.
Korean Office Action dated Jan. 24, 2011, issued in corresponding Korean Patent Application No. 10-2008-7029606.

* cited by examiner

*Primary Examiner* — Tuan Ho
*Assistant Examiner* — Shahbaz Nazrul
(74) *Attorney, Agent, or Firm* — Westerman, Hattori, Daniels & Adrian, LLP

(57) ABSTRACT

An image pickup unit that does not have a movable system and is fixed at one point picks up an image. A subject region extraction unit detects a subject in the image, extracts a region of the subject, and generates a region extraction image. A region extraction image storage unit holds a plurality of recent region extraction images. Then, a stain level calculation unit compares the held region extraction images for each pixel, and increases a value of the stain level of a pixel when it is highly probable that a stain is present on the pixel, and vise versa. The subject region extraction and the stain level calculation are performed each time an image is picked up, and the value is updated. A stain determination unit outputs whether or not a stain is present and the degree that the stain is present on the basis of the value.

10 Claims, 22 Drawing Sheets

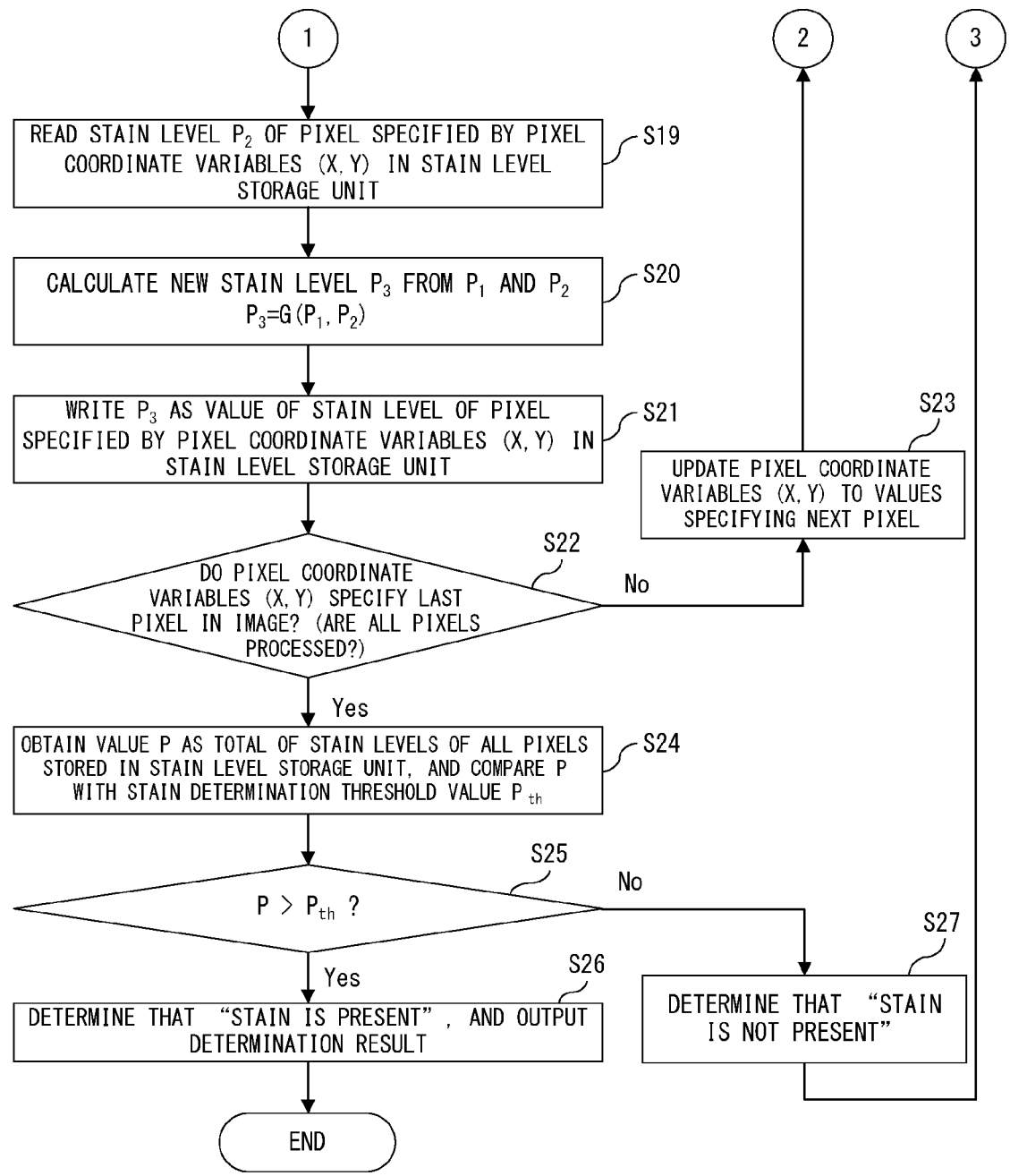
F I G. 2 B

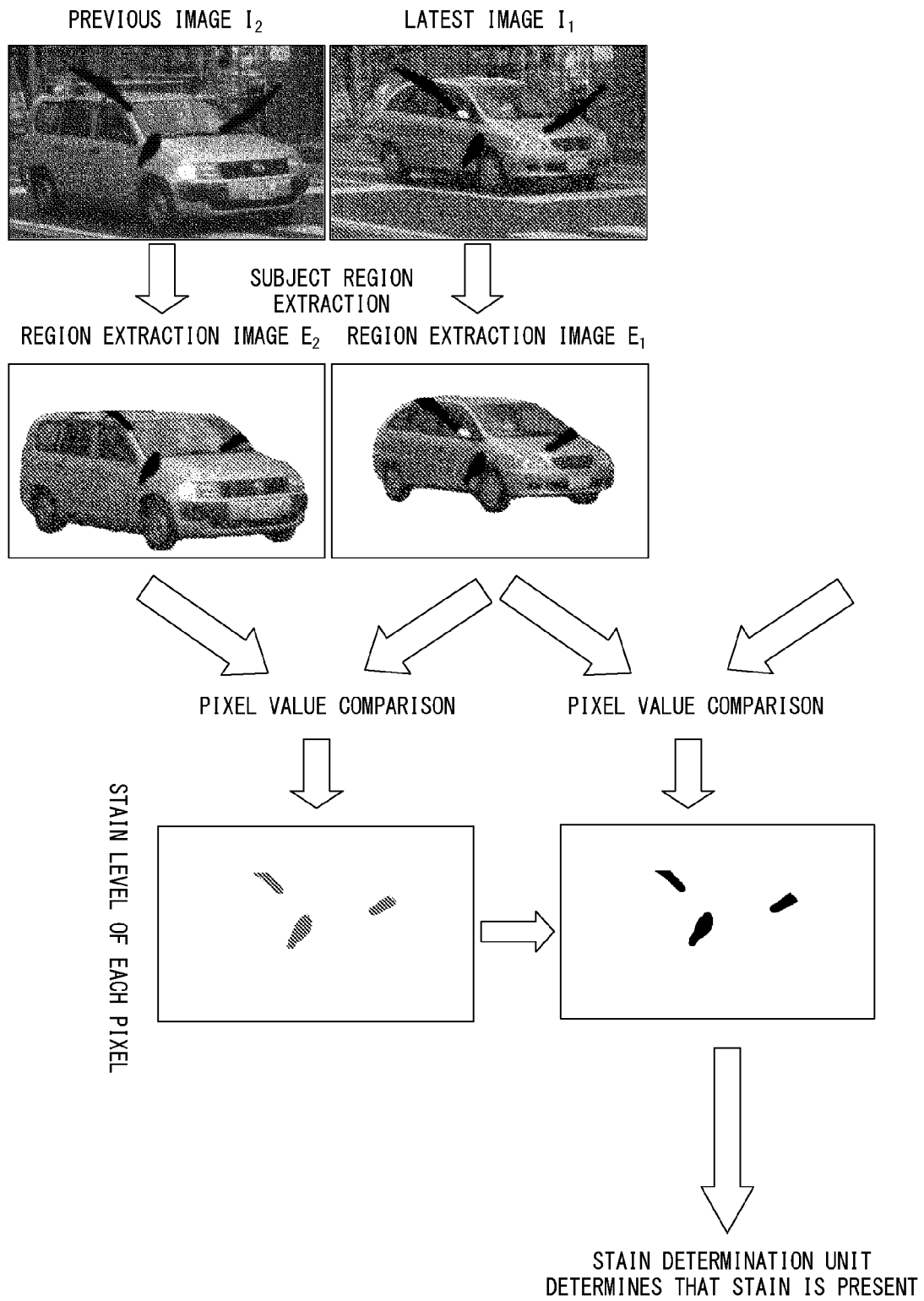
F I G. 3

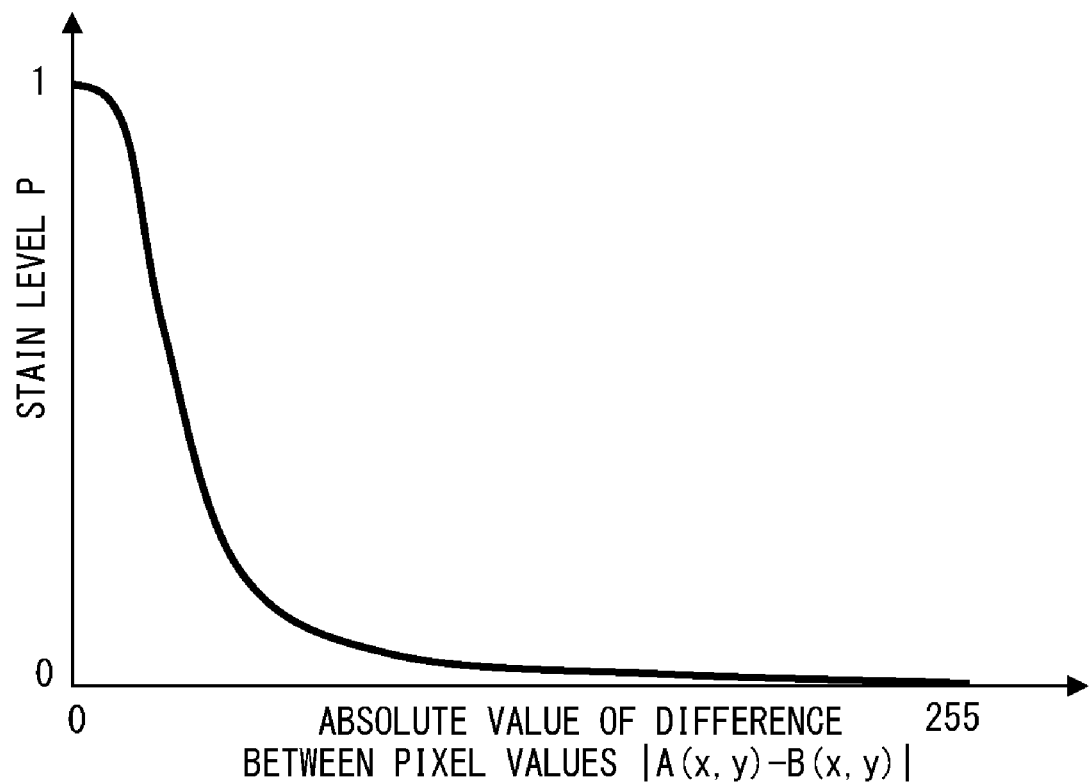
F I G. 4

|     | 0   | 15  | 30  | 45  | 60  | 75  | 90  | 105 | 120 | 135 | 150 | 165 | 180 | 195 | 210 | 225 | 240 | 255 |
| --- | --- | --- | --- | --- | --- | --- | --- | --- | --- | --- | --- | --- | --- | --- | --- | --- | --- | --- |
| 0   | 1   | 0.8 | 0.4 | 0.1 | 0   | 0   | 0   | 0   | 0   | 0   | 0   | 0   | 0   | 0   | 0   | 0   | 0   | 0   |
| 15  | 0.8 | 0.9 | 0.7 | 0.4 | 0.2 | 0.1 | 0   | 0   | 0   | 0   | 0   | 0   | 0   | 0   | 0   | 0   | 0   | 0   |
| 30  | 0.4 | 0.7 | 0.8 | 0.6 | 0.4 | 0.2 | 0   | 0   | 0   | 0   | 0   | 0   | 0   | 0   | 0   | 0   | 0   | 0   |
| 45  | 0.1 | 0.4 | 0.6 | 0.7 | 0.5 | 0.3 | 0.1 | 0   | 0   | 0   | 0   | 0   | 0   | 0   | 0   | 0   | 0   | 0   |
| 60  | 0   | 0.2 | 0.4 | 0.5 | 0.6 | 0.4 | 0.2 | 0.1 | 0   | 0   | 0   | 0   | 0   | 0   | 0   | 0   | 0   | 0   |
| 75  | 0   | 0.1 | 0.2 | 0.3 | 0.4 | 0.5 | 0.3 | 0.1 | 0   | 0   | 0   | 0   | 0   | 0   | 0   | 0   | 0   | 0   |
| 90  | 0   | 0   | 0   | 0.1 | 0.2 | 0.3 | 0.4 | 0.2 | 0.1 | 0   | 0   | 0   | 0   | 0   | 0   | 0   | 0   | 0   |
| 105 | 0   | 0   | 0   | 0   | 0.1 | 0.1 | 0.2 | 0.3 | 0.1 | 0   | 0   | 0   | 0   | 0   | 0   | 0   | 0   | 0   |
| 120 | 0   | 0   | 0   | 0   | 0   | 0   | 0.1 | 0.1 | 0.2 | 0.1 | 0   | 0   | 0   | 0   | 0   | 0   | 0   | 0   |
| 135 | 0   | 0   | 0   | 0   | 0   | 0   | 0   | 0.1 | 0.1 | 0.1 | 0   | 0   | 0   | 0   | 0   | 0   | 0   | 0   |
| 150 | 0   | 0   | 0   | 0   | 0   | 0   | 0   | 0   | 0.1 | 0.1 | 0   | 0   | 0   | 0   | 0   | 0   | 0   | 0   |
| 165 | 0   | 0   | 0   | 0   | 0   | 0   | 0   | 0   | 0   | 0   | 0.1 | 0   | 0   | 0   | 0   | 0   | 0   | 0   |
| 180 | 0   | 0   | 0   | 0   | 0   | 0   | 0   | 0   | 0   | 0   | 0   | 0   | 0   | 0   | 0   | 0   | 0   | 0   |
| 195 | 0   | 0   | 0   | 0   | 0   | 0   | 0   | 0   | 0   | 0   | 0   | 0   | 0   | 0   | 0   | 0   | 0   | 0   |
| 210 | 0   | 0   | 0   | 0   | 0   | 0   | 0   | 0   | 0   | 0   | 0   | 0   | 0   | 0   | 0   | 0   | 0   | 0   |
| 225 | 0   | 0   | 0   | 0   | 0   | 0   | 0   | 0   | 0   | 0   | 0   | 0   | 0   | 0   | 0   | 0   | 0   | 0   |
| 240 | 0   | 0   | 0   | 0   | 0   | 0   | 0   | 0   | 0   | 0   | 0   | 0   | 0   | 0   | 0   | 0   | 0   | 0   |
| 255 | 0   | 0   | 0   | 0   | 0   | 0   | 0   | 0   | 0   | 0   | 0   | 0   | 0   | 0   | 0   | 0   | 0   | 0   |

FIG. 5

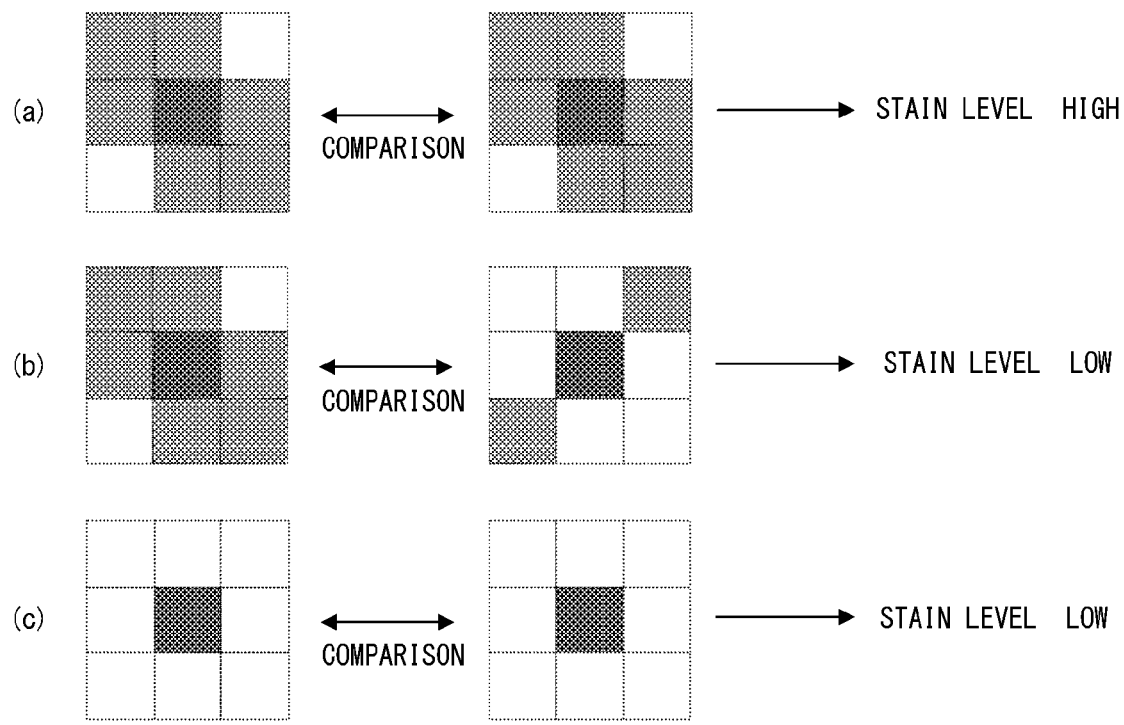
F I G. 6

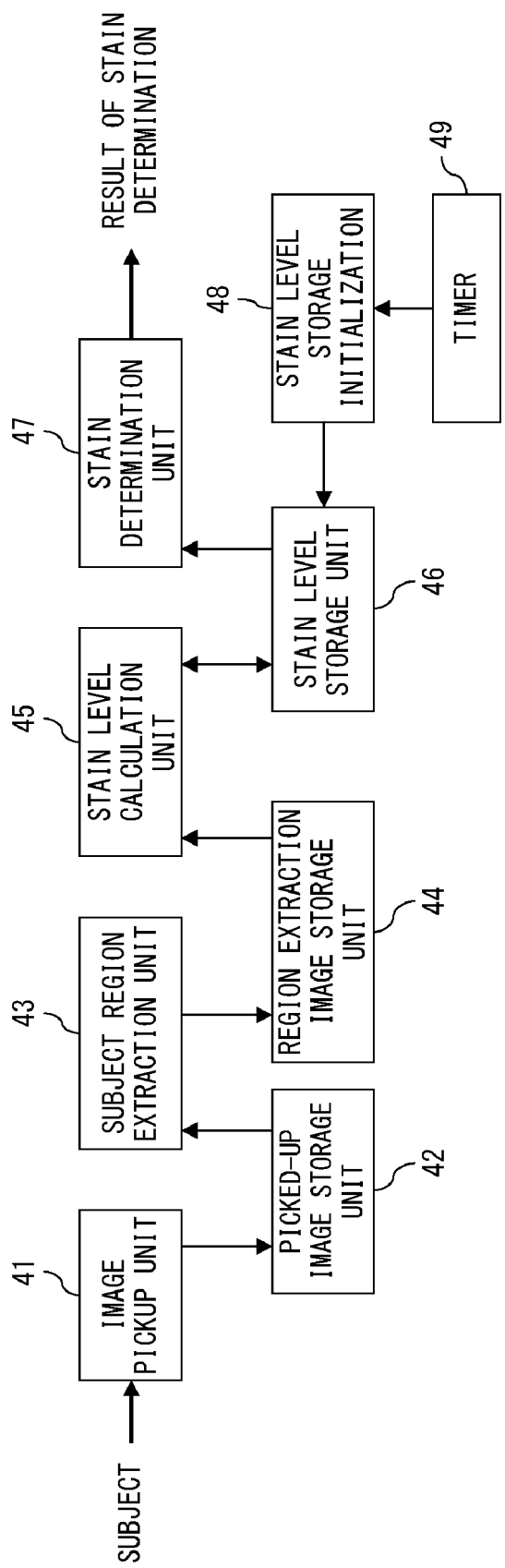
F I G. 15

STAIN DETECTION SYSTEM

CROSS-REFERENCE TO RELATED APPLICATIONS

This application is a continuation of PCT application PCT/JP2006/311527, which was filed on Jun. 8, 2006, the entire contents of which are incorporated herein by reference.

FIELD

The technique disclosed herein relates to a technique of detecting stains and foreign objects present on a surface of an image sensor exposed to the external environment from a device for picking up images, used for monitoring cameras or detection devices provided at a fixed point.

BACKGROUND

When monitoring cameras or detection devices are used, it is important that images be picked up with the highest clarity that the ability of the image sensors can realize. However, where there are stains or foreign objects present on the surface of a sensor, it is impossible to pick up clear images, and when images picked up under such photography conditions are processed, malfunctions can be caused in the device.

When images of objects of the same shape are picked up, such as in the case of manufactured products or the like, it is possible to detect stains or foreign objects if a currently picked-up image and a reference image picked up in advance are compared to each other and they are different. However, when images of objects of different shapes are to be picked up, it is impossible to compare the reference image and currently picked-up images. Also, when the same reference images are picked up and are used for comparison periodically in order to detect stains, time and labor are required to pick up the same reference images. Further, when such reference images cannot be picked up, this method cannot be employed.

In the technique for detecting stains and foreign objects present on the surface of a sensor disclosed in Patent Document 1, a mirror is provided in such a manner that the mirror reflecting the surface of the sensor of the monitoring camera is included at a corner of the picked-up image in order to detect stains and foreign objects by processing the picked-up images. This conventional technique increases the cost and size of a device because a mirror has to be provided outside the sensor. Also, this technique reduces the ability of the monitoring camera because a portion of the picked-up image is occupied by the mirror, which is problematic.

In the technique of detecting stains and foreign objects present on the surface of a sensor disclosed in Patent Document 2, a plurality of images are picked up under different photography conditions by driving image pickup elements such as a lens or diaphragm device, and thereby the portion that does not change from among the plurality of images is determined to be a stain or a foreign object. This method requires movable elements such as a lens, a diaphragm element, or the like, which increases cost. Also, the background portion, which does not change from one image to another, may be determined to be a stain by mistake because portions that do not change are considered to be stains, which is problematic.

Patent Document 1

Japanese Patent Application Publication No. 2001-8193

Patent Document 2

Japanese Patent Application Publication No. 2004-172820

SUMMARY

In the disclosed system, an image pickup unit that does not have a movable system and is fixed at one point picks up an image, a subject region extraction unit automatically detects a subject to be compared in the picked-up image, and the subject region extraction unit extracts an image region in the subject from the picked-up image picked up by the image pickup unit. Thereby, the mistaken determining of a background or the like to be a stain is avoided. A region extraction image storage unit holds a plurality of recent region extraction images obtained by extracting the image region in the subject. Then, a stain level calculation unit compares the held region extraction images. The stain level calculation unit compares the held subject region images on a pixel-by-pixel basis, and increases the value of the stain level of a pixel stored in the stain level storage unit when it is highly probable that a stain is present on the pixel, and decreases the value of the stain level of a pixel stored in the stain level storage unit when it is highly probable that a stain is not present on the pixel. Thereby, the subject region extraction and the stain level calculation are performed each time an image is picked up, and information in the stain level storage unit is updated. A stain determination unit eventually outputs a determination result which indicates whether or not a stain is present or which indicates a degree that the stain is present on the basis of the information of the stain level stored in the stain level storage unit.

According to the disclosed system, subject regions in the respective picked-up images are extracted before comparing pixel values between a plurality of picked-up images, and thereby only stains that are on the target subject and would thus interfere with the process can be detected without fail. It is also possible to avoid mistakenly determining a background or the like to be a stain, which would occur in the conventional techniques. Also, because the stain level calculation unit extracts pixels with high probability of involving stains after repeating comparisons between a plurality of images in order that the stain determination unit determines whether or not a stain is present on the basis of the probability information, a pattern that seems to be a stain at first glance in one image is not determined to be a stain by mistake.

Further, according to the disclosed system, unlike the conventional methods, it is not necessary to perform the initial setting (calibration) such as picking up a reference image (reference sheet or the like) before the operation so that the operation can be started very easily. The user cleans or exchanges devices in accordance with the output from the stain determination unit, and thereby it is possible to avoid a decrease in ability in the monitoring device or the like, which would be caused if operation is continued with a stain present on the device. Also, it is possible to automatically stop the use of the device on the basis of the determination results, and thereby it is possible to avoid demerits that would be caused when the operation is continued with a stain present on the device.

Also, unlike the conventional methods, this system does not require hardware dedicated to the stain detection or setting of different photography conditions by mechanically driving an image-pickup system, and accordingly the detection of foreign objects is realized by a device without a driving unit so that manpower and labor that would be required for maintenance when having a driving system are saved, and thereby lower costs than the conventional methods can be realized.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 2B is a flowchart illustrating operations of the system of detecting a stain according to the first embodiment;

FIG. 3 is a chart illustrating the conceptual operation of the system of detecting a stain according to the first embodiment;

FIG. 4 is a graph illustrating an example of a stain level function used in an embodiment;

FIG. 5 is a table used for calculating a stain level used in an embodiment;

FIG. 6 illustrates calculation of a stain level performed by referring to pixels surrounding a pixel of interest in an embodiment;

FIG. 15 is a block diagram illustrating a configuration of a stain detection system according to a fourth embodiment;

DESCRIPTION OF EMBODIMENTS

Figure 1:
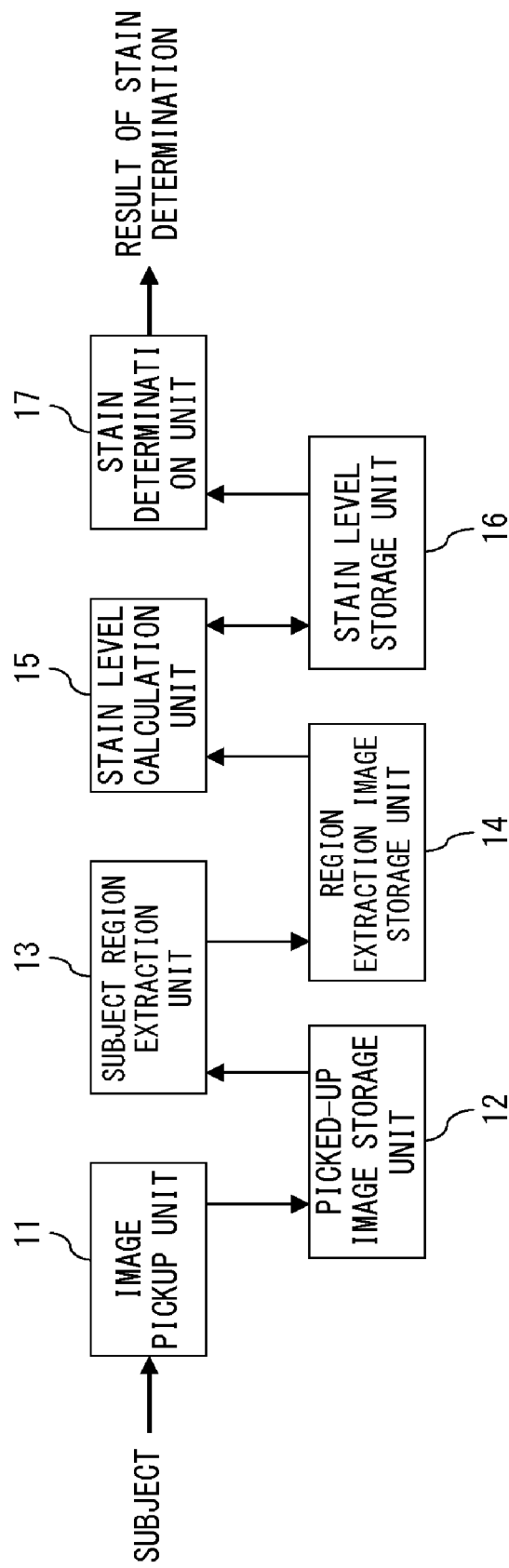
FIG. 1 is a block diagram illustrating a configuration of a system of detecting a stain according to a first embodiment.

Hereinafter, embodiments will be explained by referring to the drawings.

First Embodiment

FIG. 1 is a block diagram illustrating a configuration of a system of detecting a stain according to a first embodiment. In FIG. 1, a system of detecting a stain according to the first embodiment includes an image pickup unit 11 that does not have a movable system and is fixed at one point for continuously picking up images for a monitoring purpose or the like; a picked-up image storage unit 12 for storing images picked up by the image pickup unit 11; a subject region extraction unit 13 for detecting that a target subject (such as a vehicle) is in the picked-up image stored in the picked-up image storage unit 12, extracting the region of the subject, and generating a region extraction image; a region extraction image storage unit 14 for accumulating at least the two most recently picked-up images which undergo region extraction performed by the subject region extraction unit 13; a stain level calculation unit 15 for calculating a stain level by comparing, on a pixel-by-pixel basis, a plurality of region extraction images accumulated in the region extraction image storage unit 14; a stain level storage unit 16 for storing the calculated stain level for each pixel; and a stain determination unit 17 for evaluating the stain level for each pixel read from the stain level storage unit 16 and outputting the presence or absence of the stain or the degree of the stain being present.

Figure 2A:
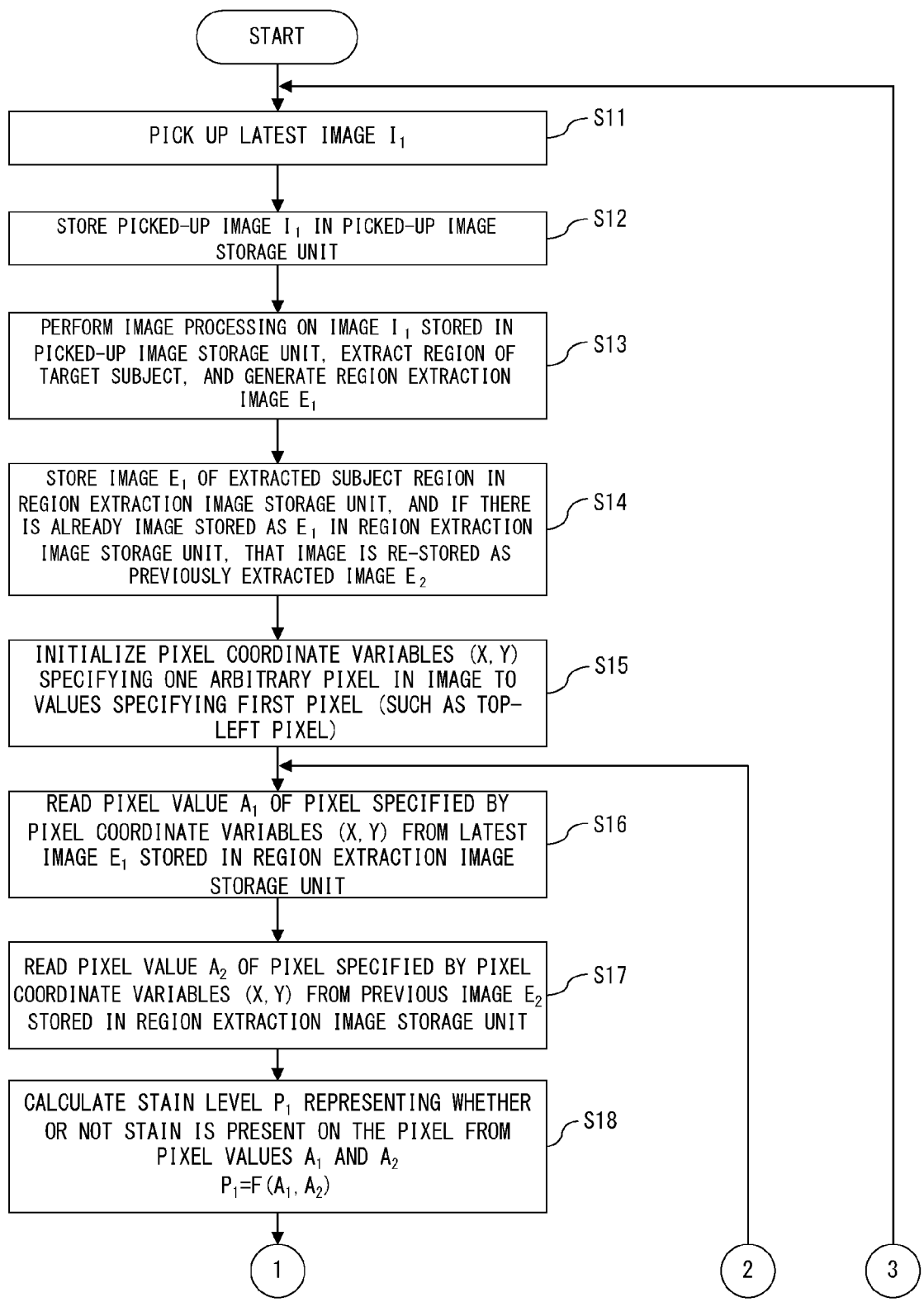
FIG. 2A is a flowchart illustrating operations of the system of detecting a stain according to the first embodiment.

FIGS. 2A and 2B illustrate a flowchart for the operations of the system of detecting a stain according to the first embodiment. In step S11 in FIG. 2A, the image pickup unit 11 picks up a latest image $I_1$. Next, in step S12, the picked-up image $I_1$ is stored in the picked-up image storage unit 12. In step S13, the subject region extraction unit 13 processes the image $I_1$ stored in the picked-up image storage unit 12 in order to extract the region of the target subject, and generates a region extraction image $E_1$. In step S14, the image $E_1$ of the extracted subject region is stored in the region extraction image storage unit 14. If there is an image that is stored as the image $E_1$ in the region extraction image storage unit 14, that image is stored as a previous image $E_2$.

In step S15, the pixel coordinate variables (X, Y) specifying an arbitrary single pixel in the image are initialized by the stain level calculation unit 15 to the values that specify the first pixel (top-left pixel or the like). In step S16, pixel value $A_1$ of the pixel specified by the pixel coordinate variables (X, Y) is read from the latest image $E_1$ stored in the region extraction image storage unit 14. In step S17, pixel value $A_2$ of the pixel specified by the pixel coordinate variables (X, Y) is read from the previous image $E_2$ stored in region extraction image storage unit 14. In step S18, a stain level $P_1$ representing whether or not a stain is present on the pixel is calculated on the basis of the pixel values $A_1$ and $A_2$. The stain level $P_1$ can be expressed as $P_1 = F(A_1, A_2)$, i.e., as a function of the pixel values $A_1$ and $A_2$.

In step S19 in FIG. 2B, a stain level $P_2$ of the pixel specified by the pixel coordinate variables (X, Y) of the stain level storage unit 16 are read out. In step S20, a new stain level $P_3$ is calculated from the stain levels $P_1$ and $P_2$. The stain level $P_3$ can be expressed as $P_3 = G(P_1, P_2)$, i.e., as a function of the stain levels $P_1$ and $P_2$. In step S21, $P_3$ is written as the value of the stain level of the pixel specified by the pixel coordinate variables (X, Y) in the stain level storage unit 16.

In step S22, it is determined whether or not the pixel specified by the pixel coordinate variables (X, Y) is the last pixel; in other words, it is determined whether or not all the pixels have been processed. If all the pixels have not been processed, the process proceeds to step S23, the pixel coordinate variables (X, Y) are updated to values specifying the next pixel in step S23, and the process returns to step S16 in FIG. 2A. If all the pixels have been processed, the process proceeds to step S24, and a value P as the total of the stain levels of all the pixels stored in the stain level storage unit 16 is obtained by the stain determination unit 17, and the value P is compared with a stain determination threshold value $P_{th}$ in step S24. In step S25, it is determined whether or not the value P is greater than the threshold value $P_{th}$. If the value P is greater, the process proceeds to step S26, and it is determined that "stain is present" in step S26, and this result is output, and thereafter the process is terminated. When the value P is not greater, the process proceeds to step S27, and it is determined that "stain is not present", and thereafter the process returns to step S11 in FIG. 2A.

As described above, according to the method of detecting a stain in the first embodiment, the subject region is extracted from each of the picked-up images before comparing the pixel values of a plurality of picked-up images to each other, and thereby it is possible to certainly detect only stains that are on the target subject and that would therefore interfere with the process. By this method, it is possible to avoid mistakenly determining that the background or the like is a stain, which has been impossible in the conventional methods. Also, the stain level calculation unit repeats the comparisons between a plurality of images in order to extract pixels with a high probability of involving stains, and the stain determination unit determines whether or not a pixel involves a stain on the basis of the probability information. Accordingly, a pattern that seems to be a stain at first glance in one image is not determined to be a stain by mistake.

Further, according to the embodiment, unlike the conventional methods, it is not necessary to perform an initial setting (calibration) such as picking up a reference image (reference sheet or the like) before the operation so that the operation can be started very easily. The user cleans or exchanges devices in accordance with the output from the stain determination unit, and thereby it is possible to avoid a decrease in ability in the monitoring device or the like, which would be caused if operation was continued with a stain present on the device. Also, it is possible to automatically stop the use of the device on the basis of the determination results, and thereby it is possible to avoid demerits that would be caused when the operation is continued with a stain present on the device.

Also, unlike the conventional methods, this system does not require hardware dedicated to the stain detection or the setting of different photography conditions by mechanically driving an image-pickup system, and accordingly the stain detection is realized by a device without a driving unit so that the manpower and labor that would be required for maintenance when having a driving system are saved, and thereby lower costs than the conventional methods can be realized.

FIG. 3 is a chart illustrating the conceptual operation of the system of detecting a stain according to the above described first embodiment. FIG. 3 illustrates an example in which a camera fixed at a single point is used as the image pickup unit 11. This camera continuously picks up images and accumulates the picked-up images in the picked-up image storage unit 12. The subject region extraction unit 13 extracts only the subject regions (the target subject is the vehicle in this example) and stores the subject regions in the region extraction image storage unit 14. According to the present embodiment, only the region including the photography target is the target of the stain detection so that only stains/foreign objects on the subject are detected and the background around the subject is not detected to be a stain or a foreign object by mistake.

The stain level calculation unit 15 compares the pixels in the regions extracted from two or more images. The fact that a present stain is included in images at the same position and with the same pixel value even when different subjects are photographed is utilized. The pixels having the same pixel value are stored in the stain level storage unit 16 as stain candidates. When this process is performed, a stain is not determined to be present only on the basis of one comparison, and the stain level is raised or lowered on the basis of the comparison results. By repeating this comparison between images many times, the stain levels at the respective pixels gradually converge so that the stain level of an actual stain increases and the stain level of a portion that is not actually a stain decreases. Thereby, even when images of similar subjects include regions having pixels with pixel values close to one another at a portion other than a stain or a foreign object, it is possible to avoid erroneous detection because the stain level of an actual stain increases while the stain levels of other portions are cancelled and decrease by accumulating the comparison results of many images.

Here, methods of calculating stain levels according to the embodiments will be explained. In the present embodiment, the stain calculation methods described below can be employed.

(First Method of Calculating Stain Level)

When it is assumed that a stain level is P, the pixel values of an arbitrary coordinate (x, y) in the latest image are A (x, y), and the pixel values of an arbitrary coordinate (x, y) in the previous image are B (x, y), the stain level P is expressed as the function below.

$$P=F(A(x,y),B(x,y))$$

The content of the function can be selected arbitrarily; however, in a function in which when the absolute value of the difference between the pixels, i.e., (A(x, y)–B(x, y)), is the smallest, the stain level P has the maximum value; in other words a function that has the characteristics illustrated in, for example, FIG. 4 is used.

(Second Method of Calculating Stain Level)

A table as illustrated in FIG. 5 is referred to, and the referred value is used as the value of stain level P (when the value is not included in the table, the value close to it is used for the interpolation, and the value obtained by the interpolation is used as the value of the stain level). In the table illustrated in FIG. 5, the vertical axis represents pixel values A(x, y) of an arbitrary coordinate (x, y) in the latest image, and the horizontal axis represents pixel values B(x, y) of an arbitrary coordinate (x, y) in the previous image. The table in FIG. 5 is a table for a stain detection filtering process in which the stain level P of a pixel becomes high when the pixel is close to black and A(x, y) and B(x, y) are close to each other.

(Third Method of Calculating Stain Level)

FIG. 6 illustrates a third method of calculating a stain level. When the stain level at an arbitrary coordinate (x, y) in the latest image is calculated, the stain level P is calculated using not only the pixel value of that coordinate (x, y) but also the pixel values of pixels close to the coordinate (x, y). In this case, only when the center pixels have the same pixel value and the pixels close to the center pixel have similar pixel values is it determined that the stain level is high, as illustrated in FIG. 6(a). Also, when an image does not have an image pattern specific to images with a stain, it is determined that the stain level is low, as illustrated in FIG. 6(c). Also, when the center pixels have the same pixel value but the pixels close to the center pixels do not have similar values, it is determined that the stain level is low as illustrated in FIG. 6(b).

Next, a stain determination method performed by the stain determination unit according to the embodiments will be explained. In the present embodiment, stain determination methods described below can be employed.

(First Stain Determination Method)

Figure 7:
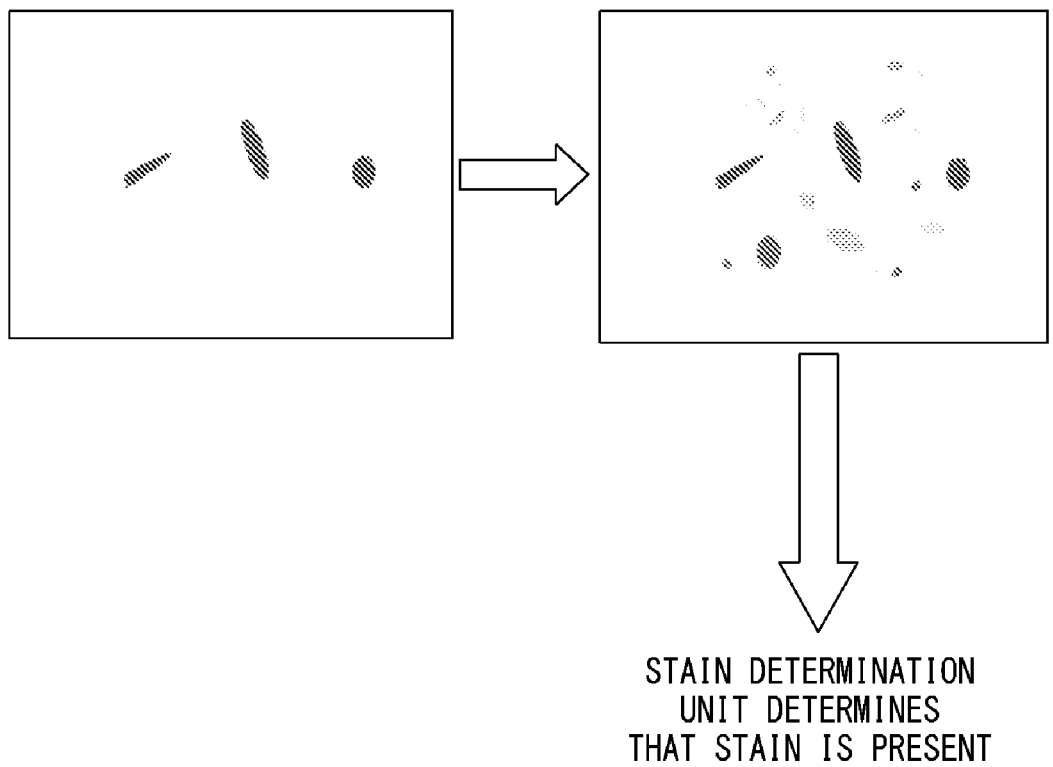
FIG. 7 illustrates a first stain determination method performed by a stain determination unit according to an embodiment.

A first stain determination method according to the embodiments is a method in which, as illustrated in FIG. 7, the total stain level of the entire image stored in the stain level storage unit is obtained, and when this total value exceeds a prescribed threshold value P_sum_thresh, it is determined that a stain is present. When this method is employed, it is possible to determine, to be a stain, a slight or dusty stain covering the entire surface of the sensor.

Figure 8:
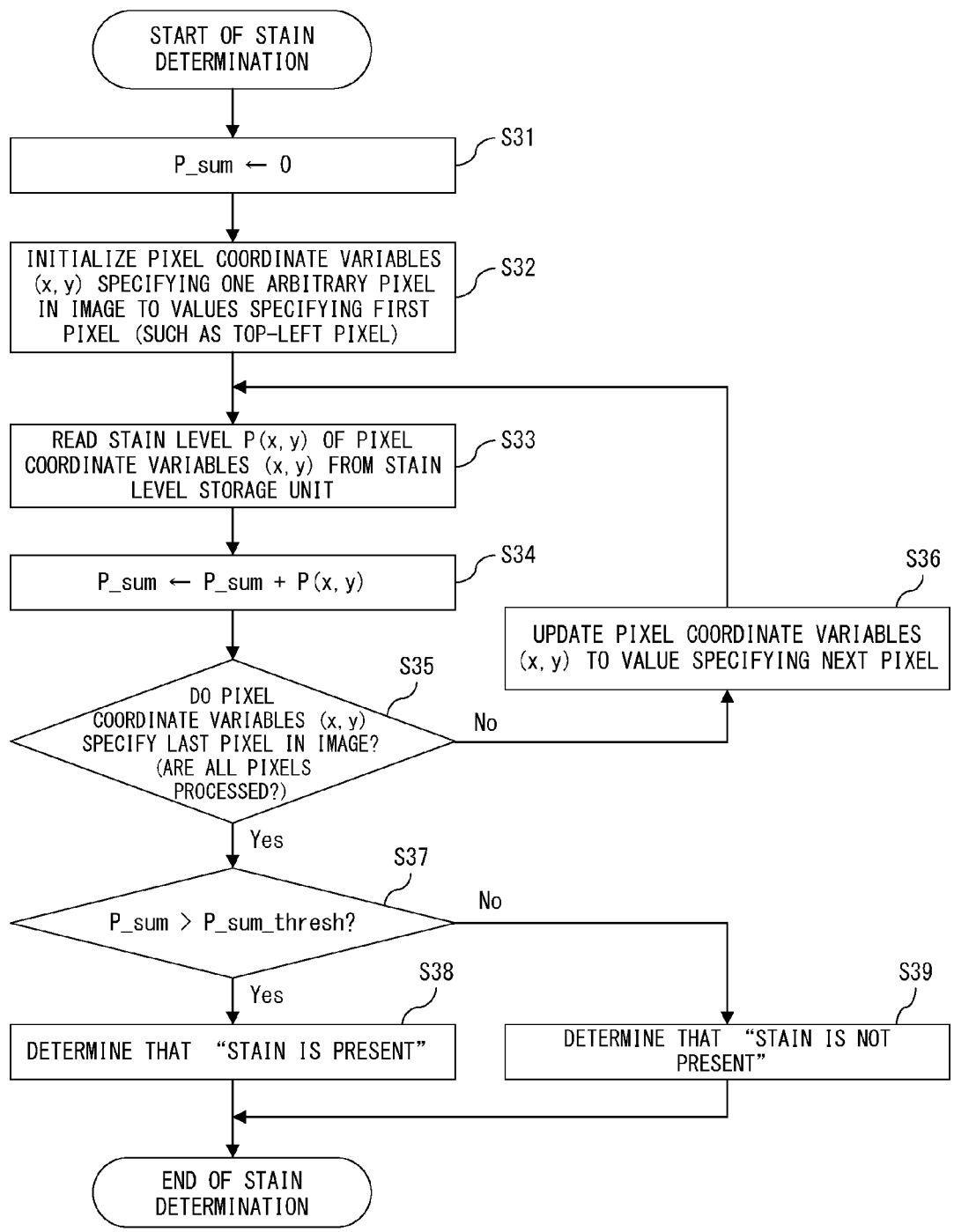
FIG. 8 is a flowchart illustrating operations of the first stain determination method illustrated in FIG. 7.

FIG. 8 is a flowchart for the first stain determination method according to the embodiments. In step S31 in FIG. 8, the stain level total value P_sum is initialized. Next, in step S32, the pixel coordinate variables (x, y) specifying an arbitrary pixel in the image are initialized to values that specify the initial pixel (top-left pixel or the like). In step S33, stain level P (x, y) of the pixel coordinate variables (x, y) is read from the stain level storage unit. In step S34, the stain level total value P_sum of the entire image and the read stain level P (x, y) are added together, and the stain level total value P_sum of the entire image is updated. In step S35, it is determined whether or not the pixel coordinate variables (x, y) are for the last pixel in the image; in other words, whether or not all the pixels have been processed.

If all the pixels have not been processed, the process proceeds to step S36, and the pixel coordinate variables (x, y) are updated to values specifying the next pixel in step S36, and the process returns to step S33. If all the pixels have been processed, the process proceeds to step S37, and it is determined whether or not the stain level total value P_sum of the entire image exceeds the threshold value P_sum_thresh. When the value exceeds the threshold value, the process proceeds to step S38, and it is determined that "stain is present" in step S38, and the stain determination is terminated. When the value does not exceed the threshold value, the process proceeds to step S39, and it is determined that "stain is not present" in step S39, and the stain determination is terminated.

(Second Stain Determination Method)

Figure 9:
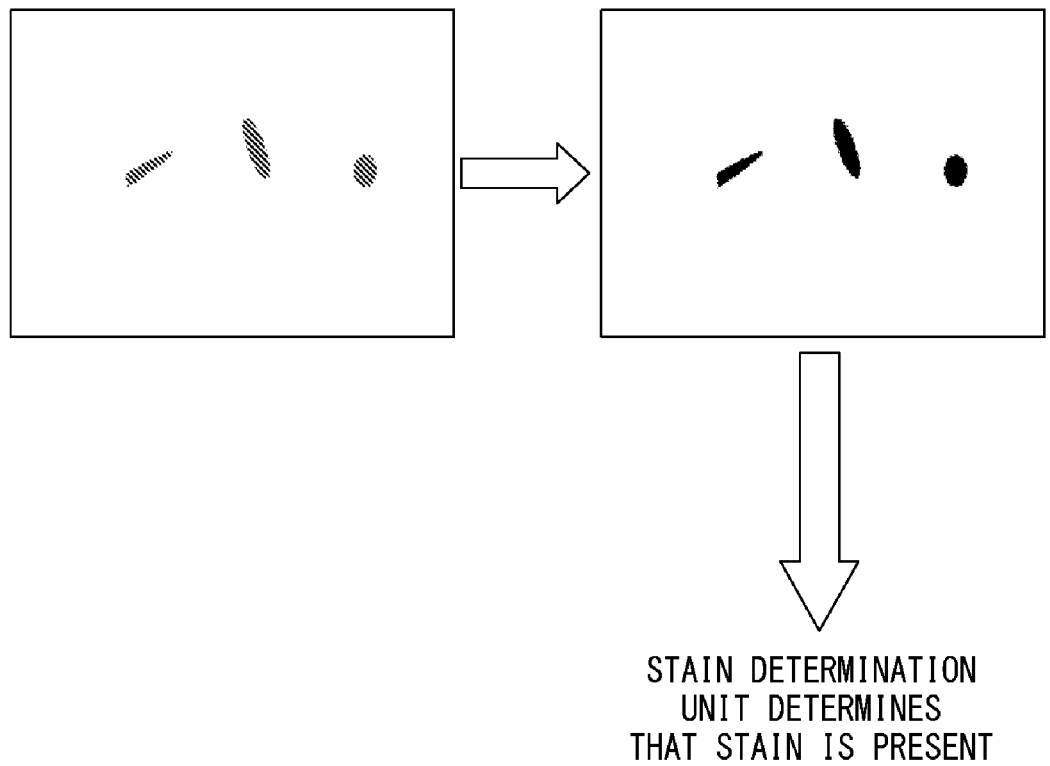
FIG. 9 illustrates a second stain determination method performed by the stain determination unit according to an embodiment.

A second stain determination method according to the embodiments is a method in which, as illustrated in FIG. 9, the stain levels throughout the entirety of the image stored in the stain level storage unit are sequentially checked, and the number "N" of pixels with stain levels higher than the predetermined threshold value N_thresh is obtained, and when the number "N" of such pixels exceeds the predetermined threshold value N_thresh, it is determined that a stain is present. By employing this method, it is possible to determine, to be stains, dark stains or parts that can be definitely determined to be stains. It is also possible to perform this determination on the basis of the total area of pixels with stain levels higher than the threshold value instead of the total number "N" of such pixels.

Figure 10:
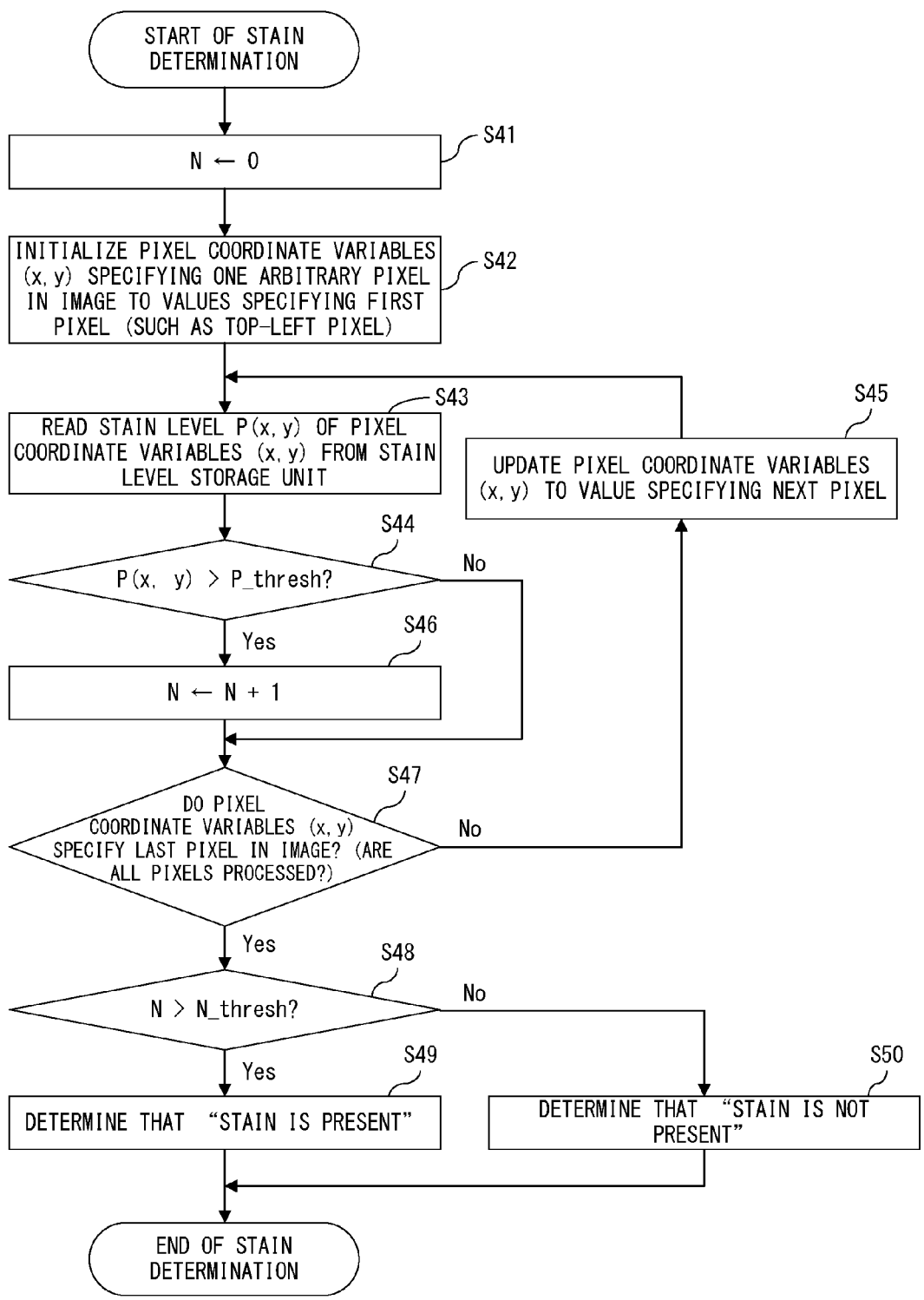
FIG. 10 is a flowchart illustrating operations of the second stain determination method illustrated in FIG. 9.

FIG. 10 illustrates a flowchart for the second stain determination method according to the embodiments. In step S41 in FIG. 10, the number "N" of pixels with stain levels higher than the threshold value P_thresh is initialized. Next, in step S42, the pixel coordinate variables (x, y) specifying an arbitrary pixel in an image are initialized to values that specify the initial pixel (top-left pixel or the like). In step S43, stain level P (x, y) of the pixel coordinate variables (x, y) is read from the stain level storage unit. In step S44, it is determined whether or not the stain level (x, y) exceeds the threshold value P_thresh.

When the above stain level is determined to not exceed the threshold value P_thresh, the process proceeds to step S45, and the pixel coordinate variables (x, y) are updated to values specifying the next pixel in step S45, and the process returns to step S43. When the stain level exceeds the threshold value P_thresh in step S44, the process proceeds to step S46, and the number "N" of pixels is incremented in step S46. Next, in step S47, it is determined whether or not the pixel coordinate variables (x, y) are for the last pixel in the image; in other words, whether or not all the pixels have been processed.

If all the pixels have not been processed, the process proceeds to step S45, and the pixel coordinate variables (x, y) are updated to values specifying the next pixel in step S45, and the process returns to step S43. If all the pixels have been processed, the process proceeds to step S48, and it is determined whether or not the total number "N" of pixels exceeds the predetermined threshold value N_thresh. When the number exceeds the threshold value, the process proceeds to step S49, and it is determined that "stain is present" in step S49, and the stain determination is terminated. When the number does not exceed the threshold value, the process proceeds to step S50, and it is determined that "stain is not present" in step S50, and the stain determination is terminated.

As described above, the stain determination unit determines the presence or absence of stains, and outputs the presence or absence of stains and the degree that the stains are present. Because the stain determination unit outputs the presence or absence of stains and the degree that the stains are present, it is possible to issue warnings before definitely determining that a stain is present. It is also possible to check the changes of states of the sensor by logging the determination results.

Second Embodiment

Figure 11:
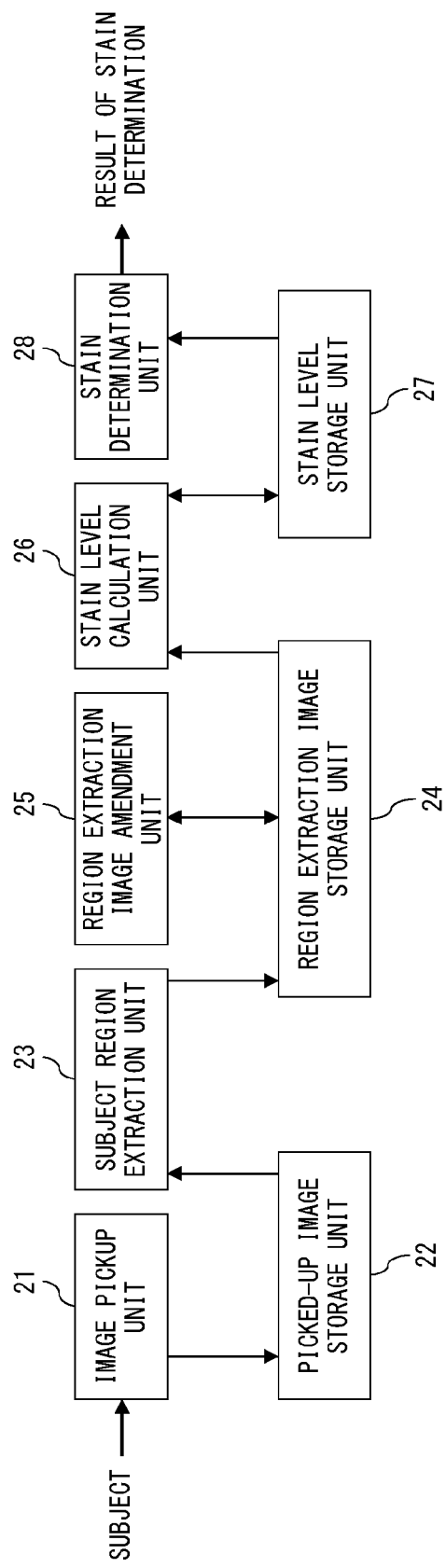
FIG. 11 is a block diagram illustrating a configuration of a stain detection system according to a second embodiment.

FIG. 11 is a block diagram illustrating a configuration of a system of detecting a stain according to the second embodiment. In FIG. 11, the system of detecting a stain according to the second embodiment comprises an image pickup unit 21 that does not have a movable system and is fixed at one point for continuously picking up images for monitoring, etc.; a picked-up image storage unit 22 for storing images picked, up by the image pickup unit 21; a subject region extraction unit 23 for detecting that a target subject (such as a vehicle) is in the picked-up image stored in the picked-up image storage unit 22, extracting the region of the subject, and generating a region extraction image; a region extraction image storage unit 24 for accumulating at least two recently picked-up images which undergo region extraction performed by the subject region extraction unit 23; a region extraction image amendment unit 25 for calculating a total luminance of all pixels in the region extraction image, amending the luminance to correspond to the predetermined luminance standard, and reaccumulating the region extraction image in the region extraction image storage unit 24; a stain level calculation unit 26 for comparing the plurality of region extraction images whose luminance was amended and that are accumulated in the region extraction image storage unit 24 among one another and calculating a stain level for each pixel; a stain level storage unit 27 for storing the calculated stain level for each pixel; and a stain determination unit 28 for evaluating the stain level for each pixel read from the stain level storage unit 27 and outputting the presence or absence of the stain or the degree of the stain being present.

Figure 12A:
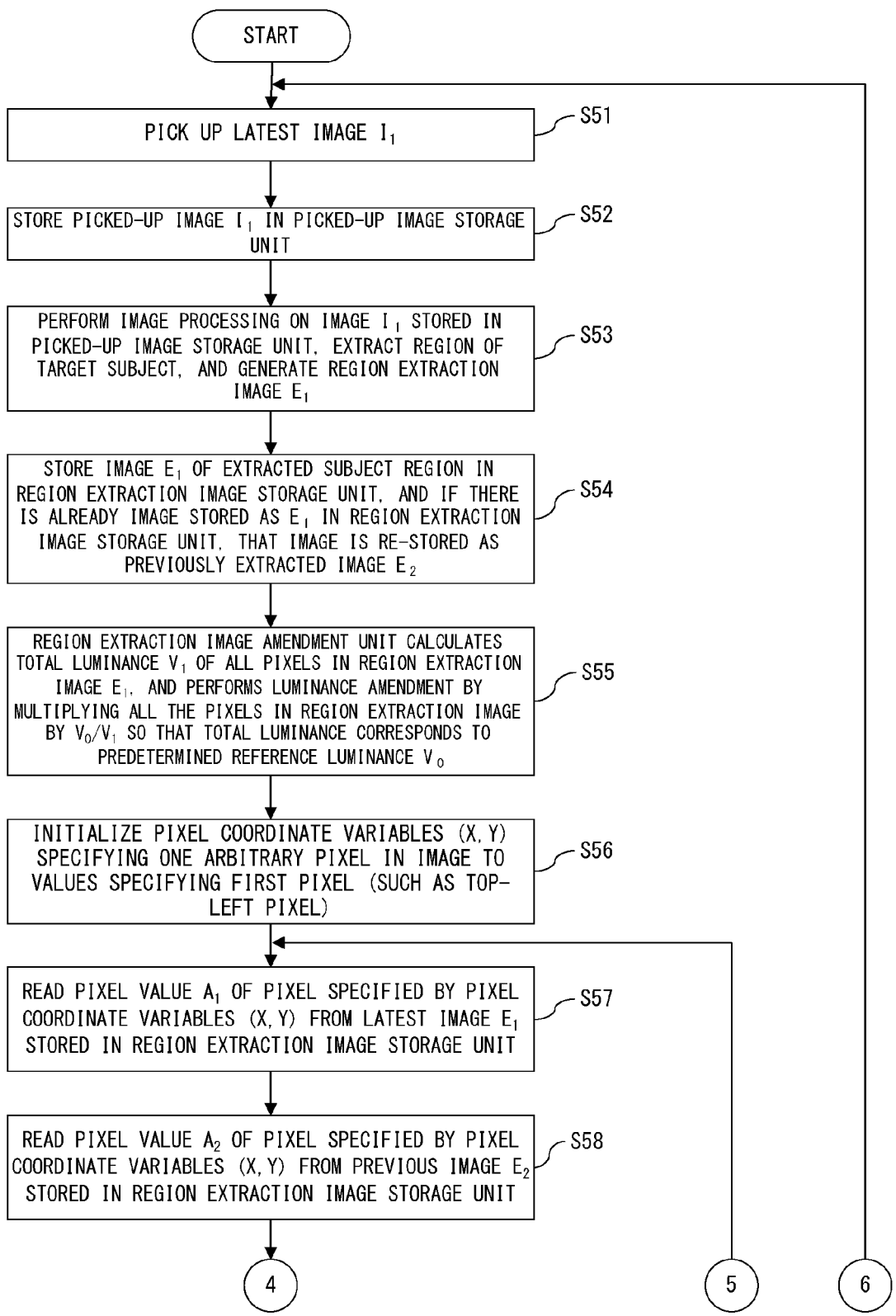
FIG. 12A is a flowchart illustrating operations of the stain detection system according to the second embodiment.
Figure 12B:
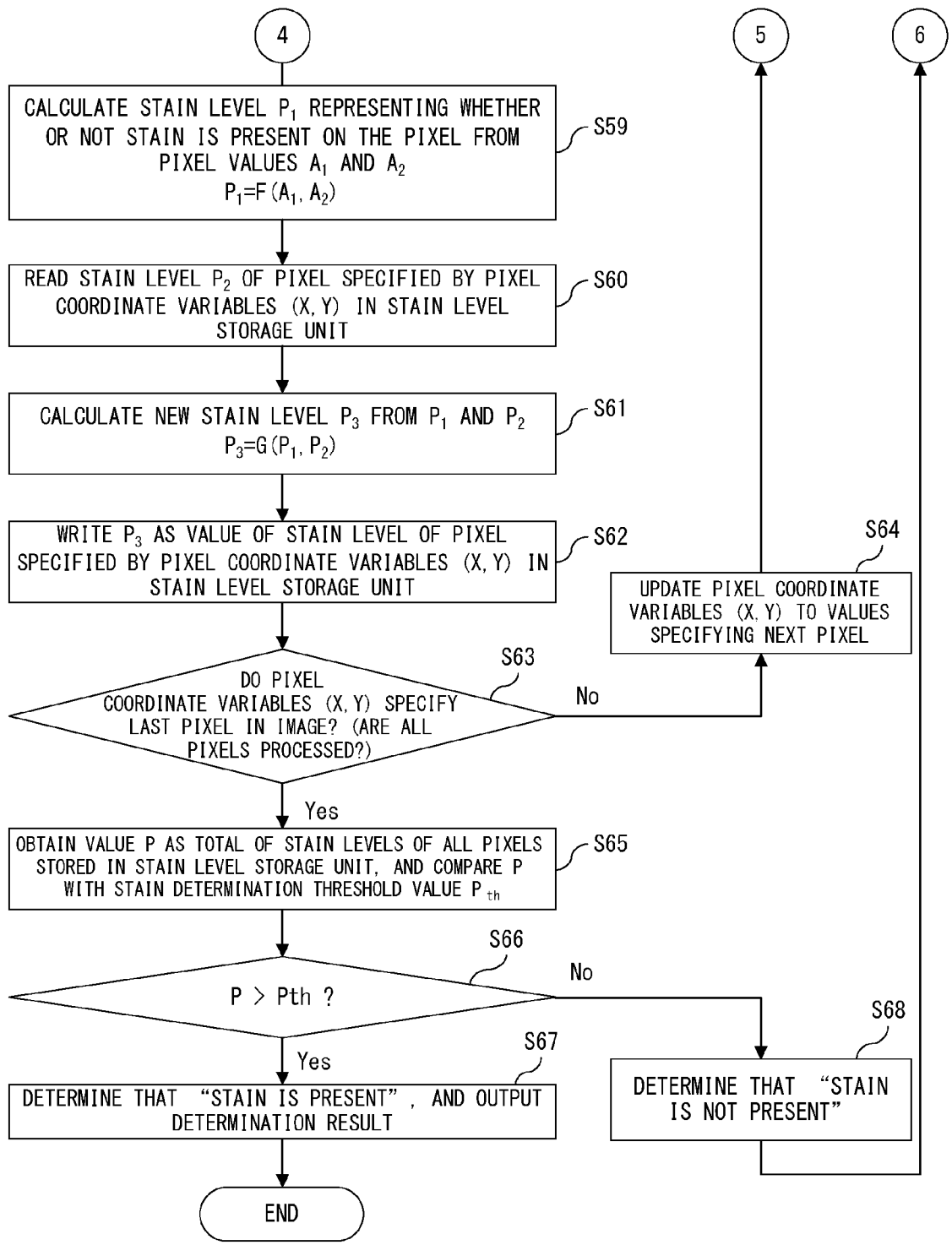
FIG. 12B is a flowchart illustrating operations of the stain detection system according to the second embodiment.

FIGS. 12A and 12B illustrate a flowchart for the system of detecting a stain according to the second embodiment. In step S51 in FIG. 12A, the image pickup unit 21 picks up the latest image $I_1$. Next, in step S52, the picked-up image $I_1$ is stored in the picked-up image storage unit 22. In step S53, the subject region extraction unit 23 performs image processing on the image $I_1$ stored in the picked-up image storage unit 22 so that the region including the target subject is extracted, and a region extraction image $E_1$ is generated. In step S54, the image $E_1$ of the extracted subject region is stored in the region extraction image storage unit 24. If there is an image that is already stored as the image $E_1$ in the region extraction image storage unit 24, that image is stored as a previous image $E_2$. In step S55, the region extraction image amendment unit 25 calculates the total luminance $V_1$ of all the pixels in the region extraction image $E_1$, and performs the luminance amendment by multiplying all the pixels in the region extraction image by $V_0/V_1$ so that the total luminance corresponds to the predetermined reference luminance $V_0$, and the images are again stored in the region extraction image storage unit 24.

In step S56, the pixel coordinate variables (X, Y) specifying an arbitrary single pixel in the image are initialized by the stain level calculation unit 26 to the values that specify the first pixel (top-left pixel or the like). In step S57, pixel value $A_1$ of the pixel specified by the pixel coordinate variables (X, Y) is read from the latest image $E_1$ stored in the region extraction image storage unit 24. In step S58, a pixel value $A_2$ of the pixel specified by the pixel coordinate variables (X, Y) is read from the previous image $E_2$ stored in the region extraction image storage unit 24.

In step S59 in FIG. 12B, a stain level $P_1$ representing whether or not a stain is present on the pixel is calculated on the basis of the pixel values $A_1$ and $A_2$. The stain level $P_1$ can be expressed as $P_1=F(A_1, A_2)$, i.e., as a function of the pixel values $A_1$ and $A_2$. In step S60, a stain level $P_2$ of the pixel specified by the pixel coordinate variables (X, Y) of the stain level storage unit 27 is read out. In step S61, a new stain level $P_3$ is calculated from the stain levels $P_1$ and $P_2$. The stain level $P_3$ can be expressed as $P_3=G(P_1, P_2)$, i.e., as a function of the stain levels $P_1$ and $P_2$. In step S62, $P_3$ is written as the value of the stain level of the pixel specified by the pixel coordinate variables (X, Y) in the stain level storage unit 27.

In step S63, it is determined whether or not the pixel specified by the pixel coordinate variables (X, Y) is the last pixel; in other words, it is determined whether or not all the pixels have been processed. If all the pixels have not been processed, the process proceeds to step S64, the pixel coordinate variables (X, Y) are updated to values specifying the next pixel in step S64, and the process returns to step S57 in FIG. 12A. If all the pixels have been processed, the process proceeds to step S65, and a value P as the total of the stain levels of all the pixels stored in the stain level storage unit 27 is obtained by the stain determination unit 28, and the value P is compared with a stain determination threshold value $P_{th}$ in step S65. In step S66, it is determined whether or not the value P is greater than the threshold value $P_{th}$. If the value P is greater, the process proceeds to step S67, and it is determined that "stain is present" in step S67, and this result is output, and thereafter the process is terminated. When the value P is not greater, the process proceeds to step S68, and it is determined that "stain is not present" in step S68, and thereafter the process returns to step S51 in FIG. 12A.

As described above, according to the method of detecting a stain of the second embodiment, the pixels to be compared undergo amendment on the basis of the luminance level of the region extraction image, so that a pixel comparison similar to the comparison of pixels picked up under the same photography conditions can be performed even when the images were picked up under different photography conditions, and thereby it is possible to calculate appropriate stain levels. Also, it is possible to increase the accuracy of stain determination by decreasing the stain levels of pixels having pixel values that can be definitely determined not to be influenced by a stain (such as pixels with high luminance) in the region extraction image before the stain level calculation.

Third Embodiment

Figure 13:
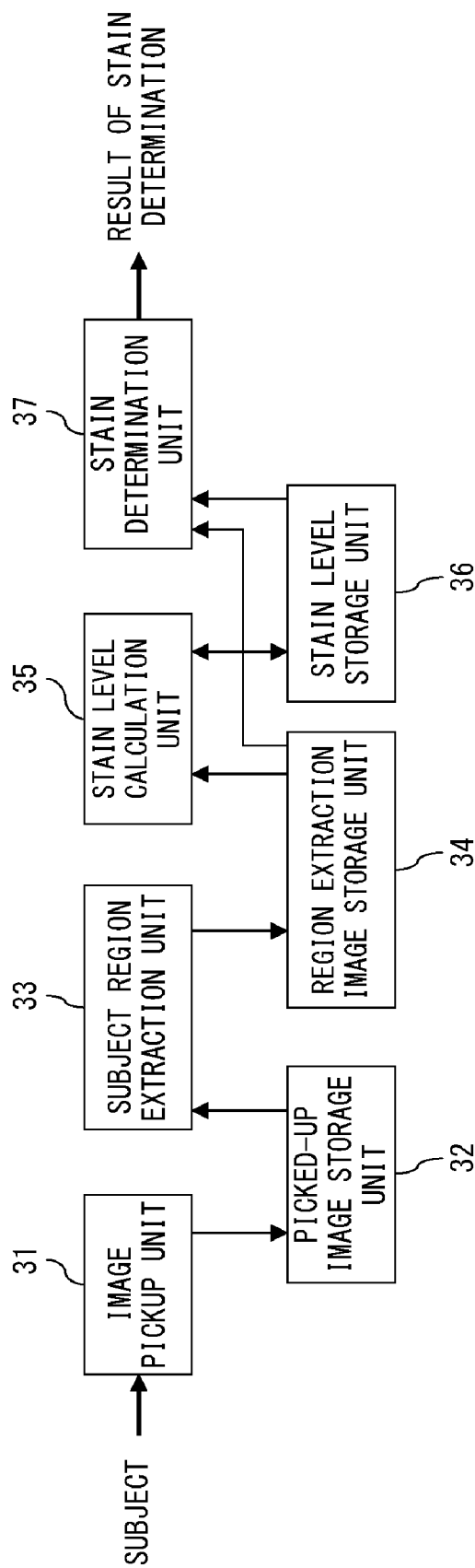
FIG. 13 is a block diagram illustrating a configuration of a stain detection system according to a third embodiment.

FIG. 13 illustrates a block diagram illustrating a configuration of a system of detecting a stain according to the third embodiment. In FIG. 13, the system of detecting a stain according to the third embodiment includes an image pickup unit 31 that does not have a movable system and is fixed at one point for continuously picking up images for monitoring, etc.; a picked-up image storage unit 32 for storing images picked up by the image pickup unit 31; a subject region extraction unit 33 for detecting that a target subject is in the picked-up image stored in the picked-up image storage unit 32, extracting the region of the subject, and generating a region extraction image; a region extraction image storage unit 34 for accumulating a plurality of images which are recently picked up and which undergo region extraction performed by the subject region extraction unit 33 and accumulating extraction region mask information for determining whether or not a pixel is in the subject region with respect to a boundary for the region extraction; a stain level calculation unit 35 for calculating a stain level by comparing, on a pixel-by-pixel basis, the plurality of recent region extraction images accumulated in the region extraction image storage unit 34; a stain level storage unit 36 for storing the calculated stain level for each pixel; and a stain determination unit 37 for determining, for each pixel, whether or not the pixel concerned is in the subject region by referring to the extraction region mask information stored in the region extraction image storage unit 34 when referring to the stain level for each pixel stored in the stain level storage unit 36, and determining whether or not the stain is present while increasing the weight of the stain level of the pixel concerned when the pixel concerned is in the subject region.

Figure 14A:
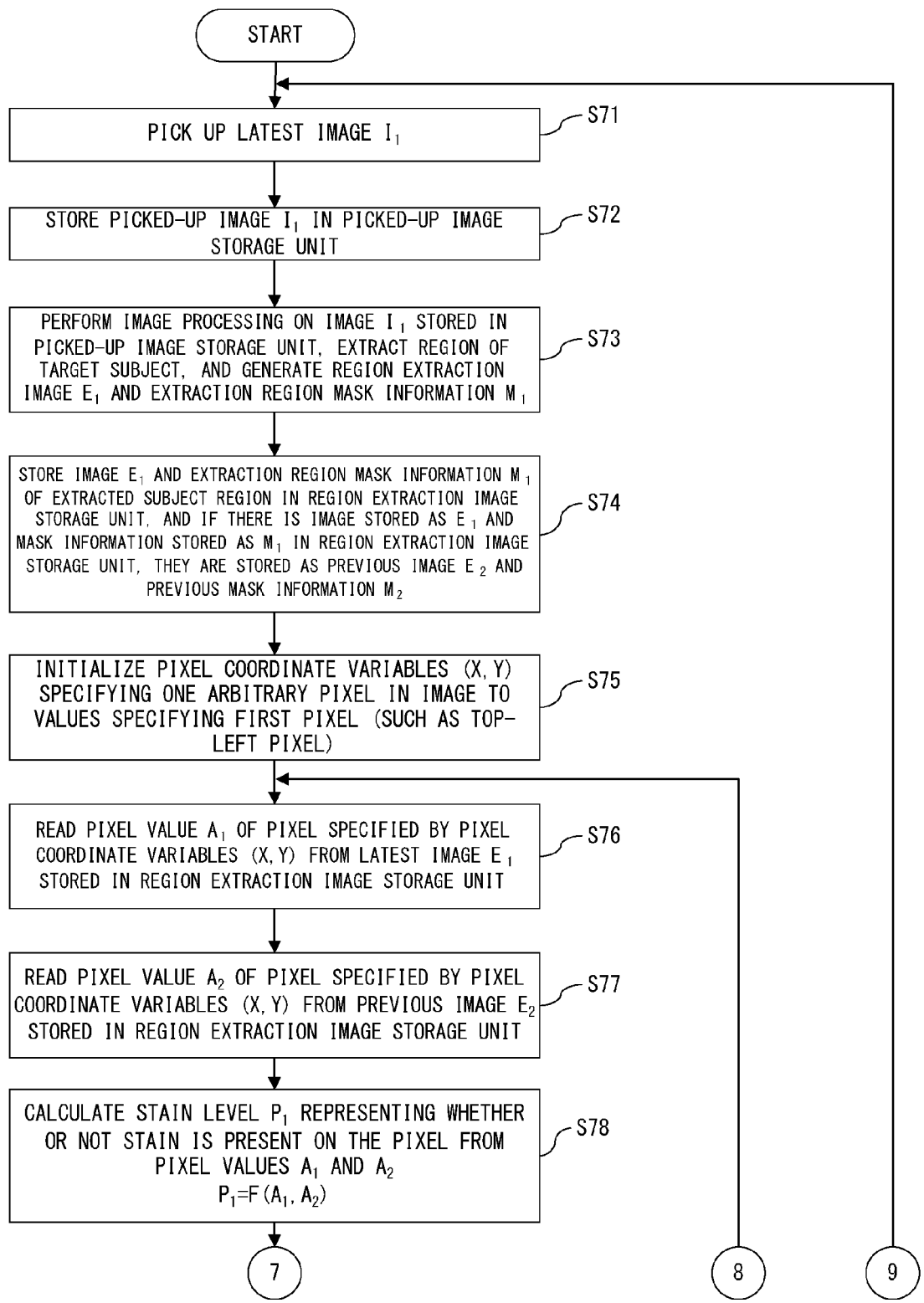
FIG. 14A is a flowchart illustrating operations of a stain detection system according to the third embodiment.
Figure 14B:
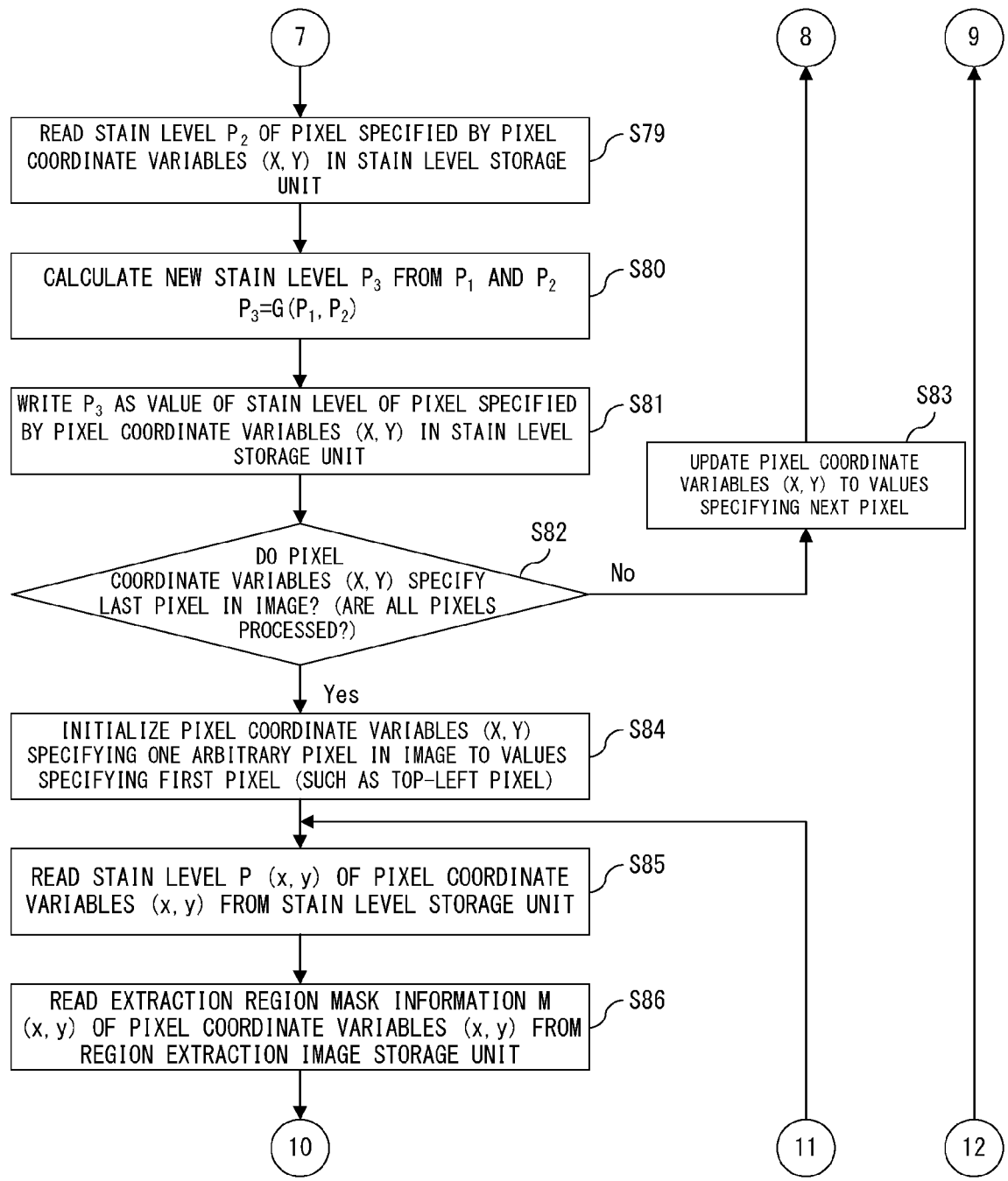
FIG. 14B is a flowchart illustrating operations of the stain detection system according to the third embodiment.
Figure 14C:
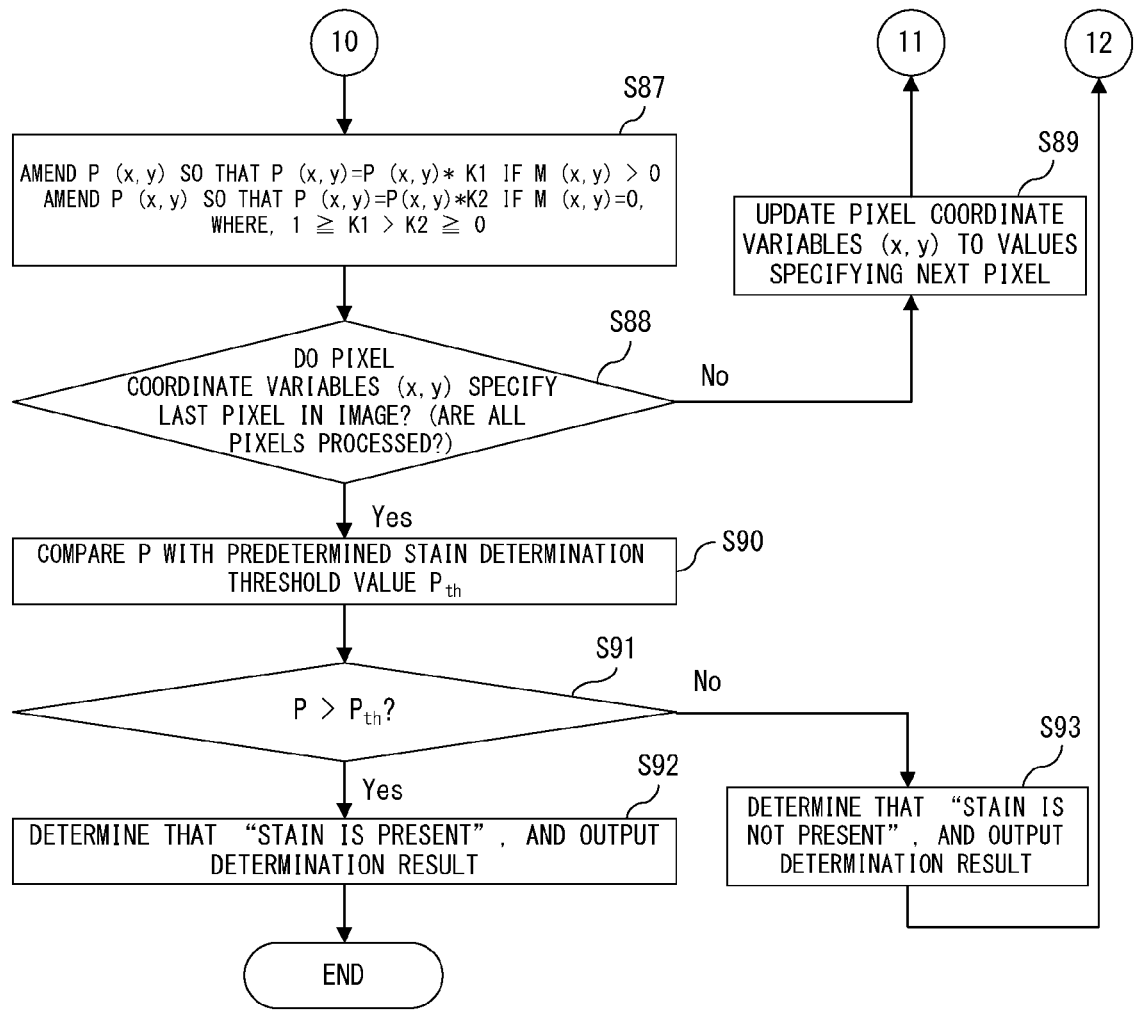
FIG. 14C is a flowchart illustrating operations of the stain detection system according to the third embodiment.

FIGS. 14A, 14B, and 14C illustrate a flowchart for the operations of the system of detecting a stain according to the third embodiment. In step S71 in FIG. 14A, the image pickup unit 31 picks up the latest image $I_1$. Next, in step S72, the picked-up image $I_1$ is stored in the picked-up image storage unit 32. In step S73, the subject region extraction unit 33 performs image processing on the image $I_1$ stored in a picked-up image storage unit 72 so that the region including the target subject is extracted, and a region extraction image $E_1$ and extraction region mask information $M_1$ are generated. In step S74, if the image $E_1$ and the extraction region mask information $M_1$ of an extracted subject region are stored in a region extraction image storage unit 74, the image that is already stored as the image $E_1$ and information already stored as the mask information $M_1$ in the region extraction image storage unit 74 are stored as a previous image $E_2$ and previous mask information $M_2$, respectively.

In step S75, the pixel coordinate variables (X, Y) specifying an arbitrary pixel in the image are initialized by the stain level calculation unit 35 to the values that specify the first pixel (top-left pixel or the like). In step S76, pixel value $A_1$ of the pixel specified by the pixel coordinate variables (X, Y) is read from the latest image $E_1$ stored in the region extraction image storage unit 34. In step S77, a pixel value $A_2$ of the pixel specified by the pixel coordinate variables (X, Y) is read from the previous image $E_2$ stored in the region extraction image storage unit 34. In step S78, the stain level $P_1$ representing whether or not a stain is present on the pixel is calculated from the pixel values $A_1$ and $A_2$. The stain level $P_1$ can be expressed as $P_1=F(A_1, A_2)$, i.e., as a function of the pixel values $A_1$ and $A_2$.

In step S79 in FIG. 14B, the stain level $P_2$ of the pixel specified by the pixel coordinate variables (X, Y) of the stain level storage unit 36 is read out. In step S80, the new stain level $P_3$ is calculated from the stain levels $P_1$ and $P_2$. The stain level $P_3$ can be expressed as $P_3=G(P_1, P_2)$, i.e., as a function of the stain levels $P_1$ and $P_2$. In step S81, $P_3$ is written as the stain value of the pixel specified by the pixel coordinate variables (X, Y) of the stain level storage unit 36. In step S82, it is determined whether or not the pixel specified by the pixel coordinate variables (X, Y) is the last pixel in the image; in other words, it is determined whether or not all the pixels have been processed. If all the pixels have not been processed, the process proceeds to step S83, the pixel coordinate variables (X, Y) are updated to values specifying the next pixel in step S83, and the process returns to step S76 in FIG. 14A. If all the pixels have been processed, the process proceeds to step S84, and the stain determination unit 37 initializes the pixel coordinate variables (x, y) specifying an arbitrary pixel in the image to values that specify the first pixel (top-left pixel or the like) In step S85, the stain level P (x, y) of the pixel coordinate variables is read from the stain level storage unit 36. In step S86, the extraction region mask information M (x, y) of the pixel coordinate variables (x, y) is read from the region extraction image storage unit 34.

In step S87 in FIG. 14C, when the extraction region mask information M (x, y) is greater than zero, the stain level P (x, y) is multiplied by the coefficient $K_1$ in order to create a new stain level P (x, y), and when the extraction region mask information M (x, y) is zero, the stain level P (x, y) is multiplied by the coefficient $K_2$ in order to create a new stain level P (x, y). However, the coefficient $K_1$ is greater than the coefficient $K_2$, and both coefficients $K_1$ and $K_2$ are between one and zero. In other words, in step S87, when the extraction region mask information M (x, y) of the pixel coordinate variables (x, y) is greater than zero (this means that the pixel is in the subject region with respect to the boundary of the subject region), the stain level is evaluated with a weight for the pixel coordinate variables (x, y) concerned, where the weight is higher than another weight with which the stain level is evaluated when the extraction region mask information M (x y) of the pixel coordinate variables (x, y) is zero (this means that the pixel is not in the subject region with respect to the boundary of the subject region).

In step S88, it is determined whether or not the pixel specified by the pixel coordinate variables (x, y) is the last pixel in the image; in other words, it is determined whether or not all the pixels have been processed. If all the pixels have not been processed, the process proceeds to step S89, the pixel coordinate variables (x, y) are updated to values specifying the next pixel in step S89, and the process returns to step S85 in FIG. 14B. If all the pixels have been processed, the process proceeds to step S90, and the value P is calculated by summing the P (x, y) of the stains of all the pixels, and P is compared with the stain determination threshold value $P_{th}$. In step S91, it is determined whether or not the value P is greater than the threshold value $P_{th}$. If the value P is greater, the process proceeds to step S92, it is determined that "stain is present" in step S92, the determination result is output, and thereafter the process is terminated. When the value P is not greater, the process proceeds to step S93, it is determined that "stain is not present", and thereafter the process returns to step S71 in FIG. 14A.

As described above, according to the method of detecting a stain of the third embodiment, when the stain determination unit performs the stain determination, the stain level of the pixel extracted as the subject region by the subject region extraction unit is given a weight greater than that given to the stain level of the pixels out of the subject region. Accordingly, it is possible to not detect stains present on unimportant portions such as corners (not on the subject), but to mainly detect stains on the subject.

Fourth Embodiment

FIG. 15 is a block diagram illustrating a configuration of a system of detecting a stain according to a fourth embodiment. In FIG. 15, the system of detecting a stain according to the fourth embodiment includes an image pickup unit 41 that does not have a movable system and is fixed at one point for continuously picking up images for monitoring, etc.; a picked-up image storage unit 42 for storing images picked up by the image pickup unit 41; a subject region extraction unit 43 for detecting that a target subject (such as a vehicle) is in the picked-up image stored in the picked-up image storage unit 42, extracting the region of the subject, and generating a region extraction image; a region extraction image storage unit 44 for accumulating at least two images which are recently picked up and which undergo region extraction performed by the subject region extraction unit 43; a stain level calculation unit 45 for calculating a stain level by comparing, on a pixel-by-pixel basis, the plurality of region extraction images accumulated in the region extraction image storage unit 44 with other pixels; a stain level storage unit 46 for storing the calculated stain level for each pixel; a stain determination unit 47 for evaluating the stain level for each pixel read from the stain level storage unit 46 and outputting the presence or absence of the stain or the degree of the stain being present; a stain level storage initialization unit 48 for periodically initializing the stain level information on all the pixels stored in the stain level storage unit 46 by being activated by a timer 49; and the timer 49 for outputting a periodical timer output to the stain level storage initialization unit 48.

Figure 16A:
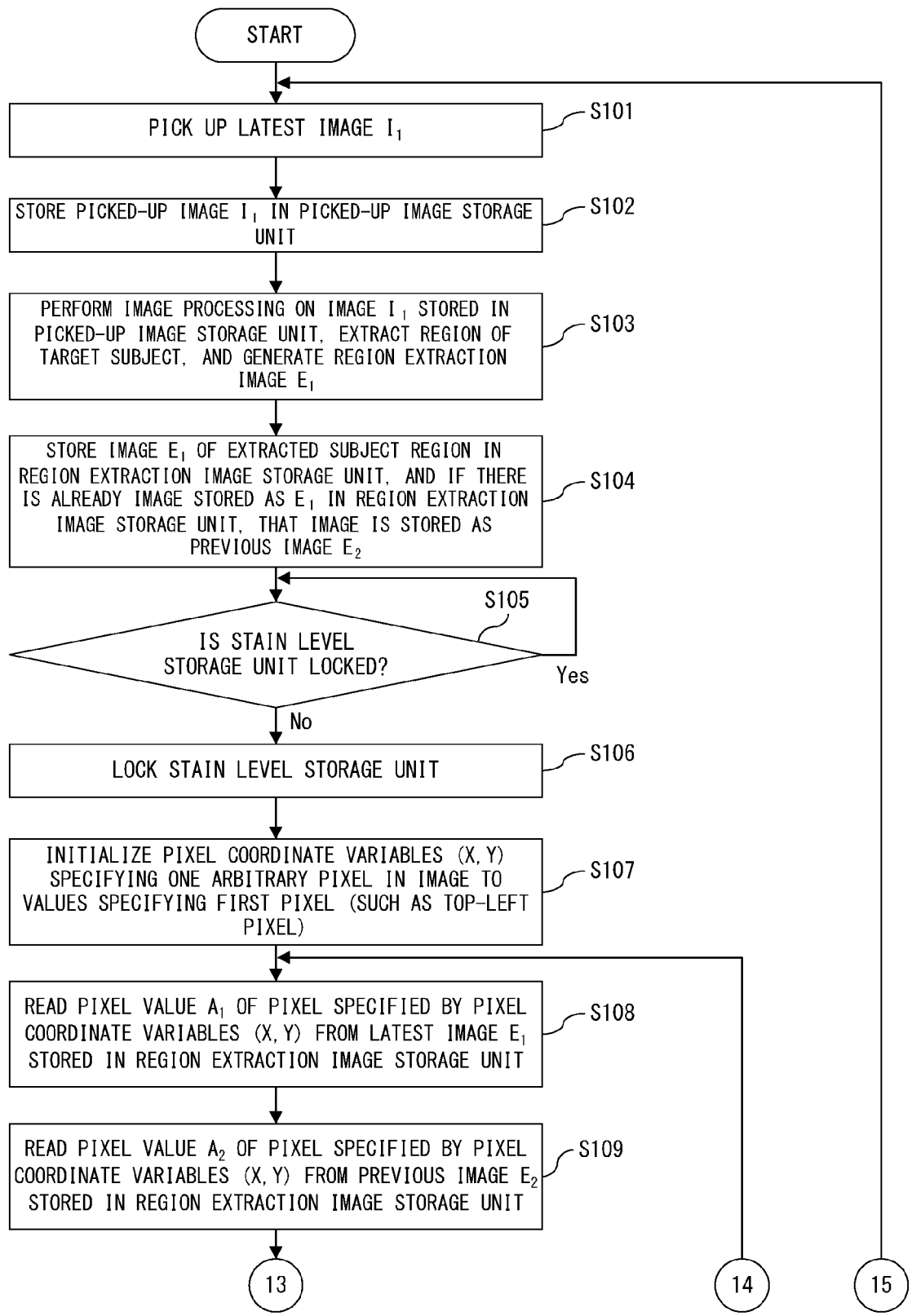
FIG. 16A is a flowchart illustrating operations of the stain detection system according to the fourth embodiment.
Figure 16B:
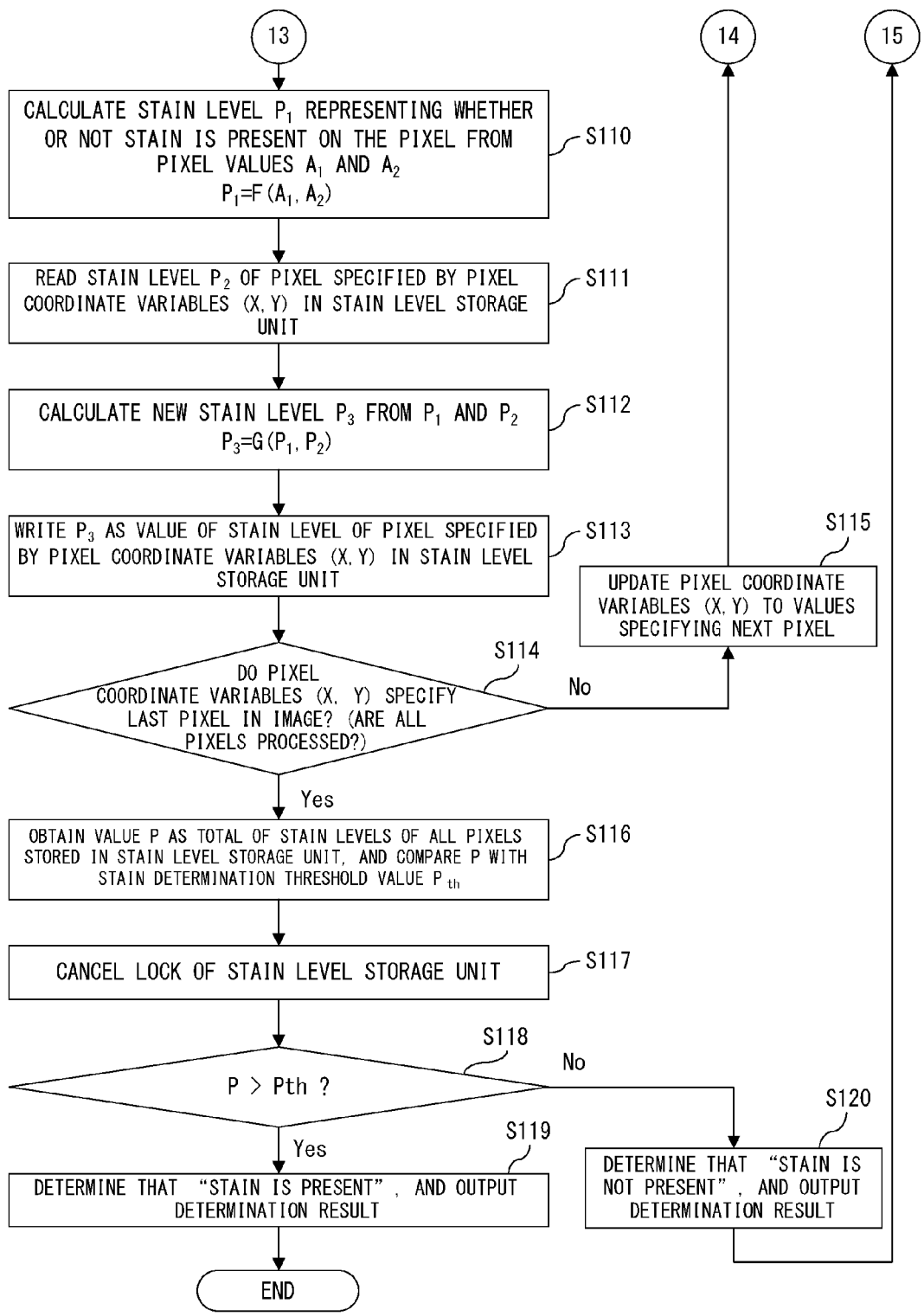
FIG. 16B is a flowchart illustrating operations of the stain detection system according to the fourth embodiment.

FIGS. 16A and 16B illustrate a flowchart for the system of detecting a stain according to the fourth embodiment. In step S101 in FIG. 16A, the image pickup unit 41 picks up a latest image $I_1$. Next, in step S102, the picked-up image $I_1$ is stored in the picked-up image storage unit 42. In step S103, the subject region extraction unit 43 performs image processing on the image $I_1$ stored in the picked-up image storage unit 42 so that the region including the target subject is extracted, and a region extraction image $E_1$ is generated. In step S104, the image $E_1$ of the extracted subject region is stored in the region extraction image storage unit 44. If there is an image that is already stored as the image $E_1$, that image is stored as the previous image $E_2$.

In step S105, it is checked whether or not the stain level storage unit 46 is locked, and the process proceeds to step S106 after confirming that the stain level storage unit 46 is not locked. In step S106, the stain level storage unit 46 is locked. The initialization operations of the stain level storage unit 46 relating to these operations will be explained in detail in FIG. 17. In step S107, the stain level calculation unit 45 initializes the pixel coordinate variables (X, Y) specifying an arbitrary pixel in the image to a value that specifies the first pixel (top-left pixel or the like). In step S108, the pixel value $A_1$ of the pixel specified by the pixel coordinate variables (X,Y) is read from the latest image $E_1$ stored in the region extraction image storage unit 44. In step S109, a pixel value $A_2$ of the pixel specified by the pixel coordinate variables (X,Y) is read from the previous image $E_2$ stored in the region extraction image storage unit 44.

In step S110 in FIG. 16B, the stain level $P_1$ representing whether or not a stain is present on the pixel is calculated from the pixel values $A_1$ and $A_2$. The stain level $P_1$ can be expressed as $P_1 = F(A_1, A_2)$, i.e., as a function of the pixel values $A_1$ and $A_2$. In step S111, the stain level $P_2$ of the pixel specified by the pixel coordinate variables (X,Y) in the stain level storage unit 46 is read out. In step S112, a new stain level $P_3$ is calculated from the stain levels $P_1$ and $P_2$. The stain level $P_3$ can be expressed as $P_3 = G(P_1, P_2)$, i.e., as a function of the stain levels $P_1$ and $P_2$. In step S113, $P_3$ is written as the stain value of the pixel specified by the pixel coordinate variables (X,Y) of the stain level storage unit 46.

In step S114, it is determined whether or not the pixel specified by the pixel coordinate variables (X, Y) is the last pixel in the image; in other words, it is determined whether or not all the pixels have been processed. If all the pixels have not been processed, the process proceeds to step S115, the pixel coordinate variables (X, Y) are updated to values specifying the next pixel in step S115, and the process returns to step S108 in FIG. 16A. If all the pixels have been processed, the process proceeds to step S116, and the stain determination unit 47 obtains the value P by summing the stains of all the pixels stored in the stain level storage unit 46, and compares P with the stain determination threshold value $P_{th}$. In step S117, the locking of the stain level storage unit 46 is cancelled. In step S118, it is determined whether value P is greater than the threshold value $P_{th}$. If the value P is greater, the process proceeds to step S119, and it is determined that "stain is present" in step S119, and the determination result is output, and thereafter the process is terminated. When the value P is not greater, the process proceeds to step S120, and it is determined that "stain is not present" in step S120, and thereafter the process returns to step S101 in FIG. 16A.

Figure 17:
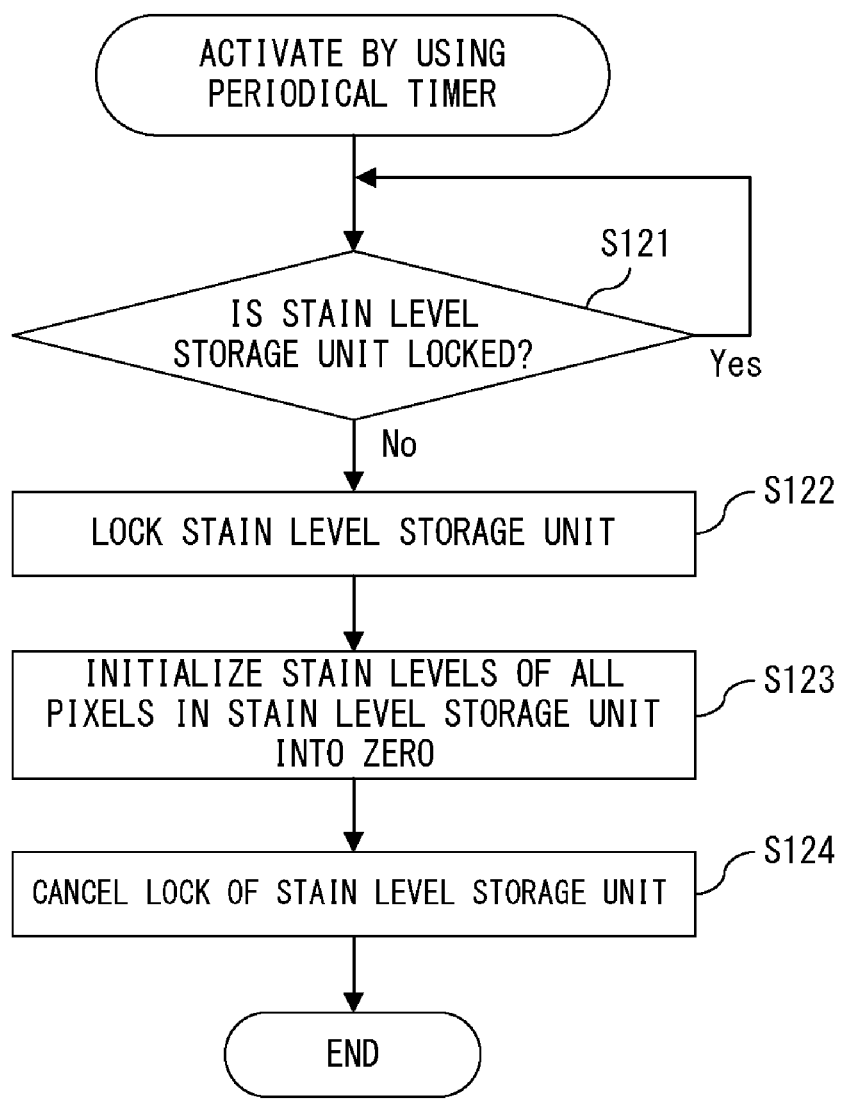
FIG. 17 is a flowchart illustrating operations of a stain level storage initialization unit according to the fourth embodiment.

FIG. 17 illustrates a flowchart for the operation of the stain level storage initialization unit according to the fourth embodiment. In FIG. 17, the stain level storage initialization unit 48 is activated by the periodical timer outputs from the timer 49. Then, in step S121, it is confirmed that the stain level storage unit 46 is not locked after checking whether or not the stain level storage unit 46 is locked, and the process proceeds to step S122. In step S122, the stain level storage unit 46 is locked. Then, in step S123, the values of the stain levels of all the pixels in the stain level storage unit 46 are initialized to zero. In step S124, the lock on the stain level storage unit 46 is cancelled. Then, the operation of the stain level storage initialization is terminated.

As described above, according to the method of detecting a stain in the fourth embodiment, it is possible, by periodically initializing the storage contents of the storage level storage unit, to avoid a situation in which invalid information is left in the stain storage unit as a result of processes performed for a long period. Thereby, it is possible to maintain accuracy in stain determination.

The application of the embodiments to monitoring devices has been explained; however, the scope of the present invention is not limited to this application, and embodiments of the present invention can be applied to many fields, including product inspection devices, biometric authentication devices, and the like that use image sensors.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

The invention claimed is:

1. A system of detecting a stain, comprising:
   an image pickup unit that does not have a movable system and is fixed at one point for continuously picking up images;
   a picked-up image storage unit for storing images picked up by the image pickup unit;
   a subject region extraction unit for detecting that a target subject is in the picked-up image stored in the picked-up image storage unit, extracting a region of the subject, and generating a region extraction image;
   a region extraction image storage unit for accumulating a plurality of images which are recently picked up and which undergo region extraction performed by the subject region extraction unit;
   a stain level calculation unit for calculating a stain level representing a probability of the stain being present by comparing, on a pixel-by-pixel basis, the plurality of recent region extraction images accumulated in the region extraction image storage unit;
   a stain level storage unit for storing the calculated stain level for each pixel; and
   a stain determination unit for evaluating the stain level for each pixel read from the stain level storage unit, and determining whether or not the stain is present.

2. The system of detecting a stain according to claim 1, wherein:
   when the stain determination unit determines that the stain is present, the determination is made on the basis of whether or not a total sum of the stain levels summed over an entirety of the image exceeds a prescribed threshold value.

3. The system of detecting a stain according to claim 1, wherein:
   when the stain determination unit determines that the stain is present, the determination is made on the basis of a total amount of pixels whose stain levels exceed a prescribed threshold value and thus can be determined to be the stain.

4. The system of detecting a stain according to claim 1, wherein:
   when the stain level calculation unit calculates the stain level of each pixel, the stain level calculation unit compares pixels at the same position in the plurality of recent region extraction images, and increases the stain level of the pixel concerned when pixel values are close to each other and decreases the stain level of the pixel concerned when pixel values are not close to each other.

5. The system of detecting a stain according to claim 1, wherein:
   the stain level calculation unit comprises a stain detection filter for detecting a pixel with a high probability of being the stain on the basis of comparison with pixel values of surrounding pixels surrounding a pixel of interest, increases the stain level of the pixel of interest when output of the stain detection filter is high, and decreases the stain level of the pixel of interest when output of the stain detection filter is low.

6. A system of detecting a stain, comprising:

an image pickup unit that does not have a movable system and is fixed at one point for continuously picking up images;

a picked-up image storage unit for storing images picked up by the image pickup unit;

a subject region extraction unit for detecting that a target subject is in the picked-up image stored in the picked-up image storage unit, extracting a region of the subject, and generating a region extraction image;

a region extraction image storage unit for accumulating a plurality of images which are recently picked up and which undergo region extraction performed by the subject region extraction unit;

a region extraction image amendment unit for calculating a total luminance of all pixels in the accumulated region extraction image, amending the luminance to correspond to a predetermined luminance standard, and reaccumulating the region extraction image in the region extraction image storage unit;

a stain level calculation unit for calculating a stain level representing a probability of the stain being present by comparing, on a pixel-by-pixel basis, the plurality of recent region extraction images accumulated in the region extraction image storage unit after undergoing luminance amendment;

a stain level storage unit for storing the calculated stain level for each pixel; and a stain determination unit for evaluating the stain level for each pixel read from the stain level storage unit and determining whether or not the stain is present.

7. The system of detecting a stain according to claim 6, wherein:

when the stain level calculation unit calculates the stain level of each pixel, the stain level calculation unit decreases the stain level of a pixel having a pixel value that can be definitely determined to not be the stain, such as a pixel with a high luminance.

8. A system of detecting a stain, comprising:

an image pickup unit that does not have a movable system and is fixed at one point for continuously picking up images;

a picked-up image storage unit for storing images picked up by the image pickup unit;

a subject region extraction unit for detecting that a target subject is in the picked-up image stored in the picked-up image storage unit, extracting a region of the subject, and generating a region extraction image;

a region extraction image storage unit for accumulating a plurality of images which are recently picked up and which undergo region extraction performed by the subject region extraction unit, and accumulating extraction region mask information for determining whether or not a pixel is in a subject region with respect to a boundary for the region extraction;

a stain level calculation unit for calculating a stain level representing a probability of the stain being present by comparing, on a pixel-by-pixel basis, the plurality of recent region extraction images accumulated in the region extraction image storage unit;

a stain level storage unit for storing the calculated stain level for each pixel; and a stain determination unit for determining, for each pixel, whether or not the pixel concerned is in the subject region by referring to the extraction region mask information stored in the region extraction image storage unit when referring to the stain level for each pixel stored in the stain level storage unit, and determining whether or not the stain is present while increasing a weight of the stain level of the pixel concerned when the pixel concerned is in the subject region.

9. The system of detecting a stain according claim 1, further comprising:

a stain level storage initialization unit for initializing content stored in the stain level storage unit, wherein:

the stain level storage initialization unit is periodically activated so as to initialize the content stored in the stain level storage unit.

10. The system of detecting a stain according to claim 1, wherein:

the stain determination unit outputs a presence or absence of the stain and a degree that the stain is present as a result of stain determination.

\* \* \* \* \*